(12) United States Patent
Dillon et al.

(10) Patent No.: US 9,449,077 B2
(45) Date of Patent: Sep. 20, 2016

(54) RECOMMENDATION SYSTEM BASED ON GROUP PROFILES OF PERSONAL TASTE

(71) Applicant: Wine Ring, Inc., Syracuse, NY (US)

(72) Inventors: Stephen Dillon, New York, NY (US); Pamela Dillon, Syracuse, NY (US); Andrew Sussman, Fayetteville, NY (US)

(73) Assignee: Wine Ring, Inc., Syracuse, NY (US)

( * ) Notice: Subject to any disclaimer, the term of this patent is extended or adjusted under 35 U.S.C. 154(b) by 533 days.

(21) Appl. No.: 13/935,169

(22) Filed: Jul. 3, 2013

(65) Prior Publication Data

US 2014/0229498 A1 Aug. 14, 2014

Related U.S. Application Data

(60) Provisional application No. 61/764,602, filed on Feb. 14, 2013, provisional application No. 61/786,989, filed on Mar. 15, 2013.

(51) Int. Cl.
*G06F 7/00* (2006.01)
*G06F 17/30* (2006.01)

(52) U.S. Cl.
CPC .................. *G06F 17/3064* (2013.01)

(58) Field of Classification Search
CPC ............... G06F 17/30; G06F 17/3064; G06F 17/30867; G06F 17/30598; G06F 17/30864; G06F 17/30324
See application file for complete search history.

(56) References Cited

U.S. PATENT DOCUMENTS

| | | | |
|---|---|---|---|
| 5,200,909 A | 4/1993 | Juergens | |
| 5,990,885 A | 11/1999 | Gopinath | |
| 7,003,515 B1 | 2/2006 | Glaser et al. | |
| 7,403,910 B1 | 7/2008 | Hastings et al. | |
| 7,593,863 B1 | 9/2009 | Sunshine et al. | |
| 7,617,127 B2 | 11/2009 | Hunt et al. | |
| 7,962,482 B2 | 6/2011 | Handman et al. | |
| 8,001,008 B2 | 8/2011 | Engle | |
| 8,001,064 B1 | 8/2011 | Rennison | |
| 8,037,080 B2 | 10/2011 | Koren | |
| 8,700,448 B2* | 4/2014 | Bertram | G06Q 30/02 701/438 |
| 9,055,340 B2* | 6/2015 | Murakami | H04N 21/252 |

(Continued)

OTHER PUBLICATIONS

O'Connor et al., "PolyLens: A Recommender System for Groups of Users", Proceedings of the Seventh European Confernce on Computer-Supported Cooperative Work, Sep. 16-20, 2001, Bonn, Germany, pp. 199-218.

(Continued)

*Primary Examiner* — Azam Cheema
(74) *Attorney, Agent, or Firm* — Fox Rothschild LLP

(57) ABSTRACT

This document describes a method and system for recommending items, such as beverages, that members of a group are likely to find appealing. When group members are identified, the system may identify one or more preference models for each member. Each preference model represents a pattern of dependency between characteristics of items that the member has rated and the member's ratings for those items. The system may develop a group preference profile by merging the patterns of dependency for each of the members into a group preference model. Then, when it receives a request for a recommendation for an item, the system uses the group preference profile to select, from a database, a candidate item having characteristics which are likely to appeal to many or all members of the group.

47 Claims, 14 Drawing Sheets

(56) References Cited

U.S. PATENT DOCUMENTS

| | | |
|---|---|---|
| 2002/0111899 A1 | 8/2002 | Veltre et al. |
| 2004/0148107 A1 | 7/2004 | Piotrowski et al. |
| 2004/0181445 A1 | 9/2004 | Kolsky et al. |
| 2005/0075923 A1 | 4/2005 | Kolsky et al. |
| 2006/0259344 A1 | 11/2006 | Patel et al. |
| 2007/0150428 A1 | 6/2007 | Webb |
| 2008/0160147 A1 | 7/2008 | Tormey |
| 2009/0055139 A1 | 2/2009 | Agarwal et al. |
| 2009/0083126 A1 | 3/2009 | Koren et al. |
| 2009/0083258 A1 | 3/2009 | Koren et al. |
| 2009/0119234 A1 | 5/2009 | Pinckney et al. |
| 2009/0186700 A1* | 7/2009 | Konkle .......... A63F 13/12 463/42 |
| 2009/0210246 A1 | 8/2009 | Patel et al. |
| 2009/0210321 A1 | 8/2009 | Rapp |
| 2010/0088649 A1 | 4/2010 | Kemp |
| 2010/0169343 A1* | 7/2010 | Kenedy .......... G06F 17/30867 707/758 |
| 2010/0185933 A1 | 7/2010 | Coffman et al. |
| 2010/0250556 A1 | 9/2010 | Park et al. |
| 2010/0287033 A1 | 11/2010 | Mathur |
| 2011/0208617 A1 | 8/2011 | Weiland |
| 2012/0030060 A1 | 2/2012 | Lu et al. |
| 2012/0041969 A1 | 2/2012 | Priyadarshan et al. |
| 2012/0047105 A1 | 2/2012 | Saigal et al. |
| 2012/0226698 A1 | 9/2012 | Silvestre et al. |
| 2013/0006904 A1 | 1/2013 | Horvitz et al. |
| 2013/0080438 A1 | 3/2013 | Tompkins |
| 2014/0258027 A1* | 9/2014 | Veugen .......... G06Q 30/0278 705/26.7 |

OTHER PUBLICATIONS

Xiong et al., "Application of Multivariate Adaptive Regression Splines (MARS) to the Preference Mapping of Cheese Sticks", Journal of Food Science, vol. 69, Nr. 4, 2004.

* cited by examiner

| WID | Cl | GRAPE | COUNTRY | El | M | B | Ac | Ol | Tl | FLAVORS |
|---|---|---|---|---|---|---|---|---|---|---|
| 70 | 14 | SYRAH | NEW ZEALAND | | | | | | | BLACK, RED, Blk_Spice, EARTH, MINERAL, WOOD |
| 83 | 14 | PINOTAGE | SOUTH AFRICA | | | | | | | BLACK, EARTH, MICROBIAL, MINERAL, WOOD |
| 50 | 3 | CABERNET SAUVIGNON | CHILE | | | | | | | BLACK, RED, CHEMICAL, EARTH, VEGETAL, WOOD |
| 48 | 3 | CABERNET SAUVIGNON | USA | | | | | | | BLACK, HERBAL, WOOD |
| 49 | 3 | CABERNET SAUVIGNON | USA | | | | | | | BLACK, EARTH, FLORAL, WOOD |
| 74 | 13 | MERLOT | USA | | | | | | | BLACK, CHEMICAL, HERBAL, WOOD |
| 75 | 13 | MERLOT | USA | | | | | | | BLACK, CHEMICAL, HERBAL, WOOD |
| 68 | 13 | SHIRAZ | AUSTRALIA | | | | | | | BLACK, RED, Blk_Spice, HERBAL, WOOD |
| 85 | 13 | ZINFANDEL | USA | | | | | | | BLACK, RED, Blk_Spice, HERBAL, WOOD |
| 80 | 4 | PINOT NOIR | USA | | | | | | | BLACK, RED, Brn_Spice, EARTH, WOOD |
| 81 | 4 | PINOT NOIR | USA | | | | | | | BLACK, RED, EARTH, HERBAL, WOOD |
| 113 | 4 | SYRAH | USA | | | | | | | RED, Blk_Spice, HERBAL, WOOD |
| 69 | 4 | SHIRAZ | AUSTRALIA | | | | | | | RED, Blk_Spice, HERBAL, WOOD |
| 51 | 4 | CARMÉNÈRE | CHILE | | | | | | | BLACK, ANIMAL, EARTH, HERBAL, WOOD |
| 86 | 4 | MALBEC | ARGENTINA | | | | | | | BLACK, FLORAL, WOOD |

FIG. 9

RECOMMENDATION SYSTEM BASED ON GROUP PROFILES OF PERSONAL TASTE

RELATED APPLICATIONS AND CLAIM OF PRIORITY

This patent document claims priority to U.S. Provisional Patent Application Nos. 61/764,602 filed Feb. 14, 2013, and 61/786,989 filed Mar. 15, 2013, the disclosures of which are each incorporated herein by reference in their entirety.

This patent document is related to U.S. patent application Ser. No. 13/909,401, filed Jun. 4, 2013, titled "Personal Taste Assessment Method and System."

BACKGROUND

This document describes methods and systems for recommending items, such as beverages and other consumable items, to members of groups based on the preferences of consumers who are members of the groups.

SUMMARY

In an embodiment, a group recommendation system includes a processor (which may include one processor or a group of processors), a non-transitory computer-readable medium portion holding a database comprising characteristics for a various candidate items, and a non-transitory computer-readable medium portion holding programming instructions that, when executed, are configured instruct the processor to generate group recommendations for items. To do so, the system identifies a preference profile for each user in a group of users, wherein the preference profile for each user comprises data that represents a pattern of dependency between the user's ratings for a plurality of items that the user has rated, and characteristics of at least a portion of the rated items to which the user's ratings apply. The system will merge users' data that represents patterns of dependency into a group preference profile, receive a request for a group recommendation, use the group preference profile to select from the database a candidate item having characteristics that multiple users in group are expected to find appealing, and generate a recommendation for the selected candidate item.

Optionally, when merging a plurality of the users' data into the group preference profile, the system may identify consistent preference models for the users, merge the identified consistent preference models into a merged preference model, and include the merged preference model in the group preference profile. As another option, the system may identify merged item descriptions for a set of the rated items, and it may include the merged item descriptions in the group preference profile. As another option, the system may identify similar item descriptors in the preference profiles for a plurality of the users, and it may merge the similar item descriptors into the merged item description.

As another option, the system may identify merged degrees of appeal for a plurality of items and classes, and it may include the merged degrees of appeal in the group preference profile. If so, it may identify an item or class to which a plurality of the users have assigned similar ratings, and it may merge the similar ratings into the merged degree of appeal. Optionally, as a condition of merging the similar ratings into the merged degree of appeal, the system may require that at least a threshold portion of the users have assigned similar ratings to that item or class.

In some embodiments, the system may require, as a condition of merging the similar item descriptors into the merged item description for an item, that at least a threshold portion of the users have profiles with similar item descriptors for that item.

In some embodiments, the system may determine a confidence level in the group preference profile.

Additionally, the system may determine whether the request for a recommendation includes a constraint, and if so it may require that the candidate item satisfies the constraint before recommending the candidate item.

Additionally, the system may receive a precedence order for the users in the group, and when developing the group preference profile, it may assign a higher weight to a pattern of dependency associated with a user who is higher in the precedence order than to a pattern of dependency associated with a user who is lower in the precedence order.

Additionally, the system may include additional merged preference models in the group preference profile, and it may order the merged preference models that are included in the group preference profile on the basis of a social welfare function.

In an alternate embodiment, a method implemented by a processor (which may include one or more processors) includes receiving, via a user interface, a selection of a group having multiple members, and identifying a preference profile for each member. The preference profile for each member includes data that represents a pattern of dependency between the member's ratings for items that the profile's member has rated and characteristics of at least a portion of the rated items to which the member's ratings apply. The processor develops a group preference profile by merging the data that represents a pattern of dependency for each of the members; receives, via the user interface, a request for a recommendation for an item; accesses a database of candidate items, wherein each candidate idem is associated with at least one characteristic; uses the group preference profile to select, from the database, a candidate item having characteristics which are likely to appeal to at least a plurality of members of the group; and generates a recommendation for the selected candidate item.

BRIEF DESCRIPTION OF THE DRAWINGS

FIG. 3 is an example of a user taste profile report.

FIG. 4 illustrates an example of a user interface for providing recommendations.

FIG. 9 illustrates an example of a class hierarchy.

DETAILED DESCRIPTION

Figure 1:
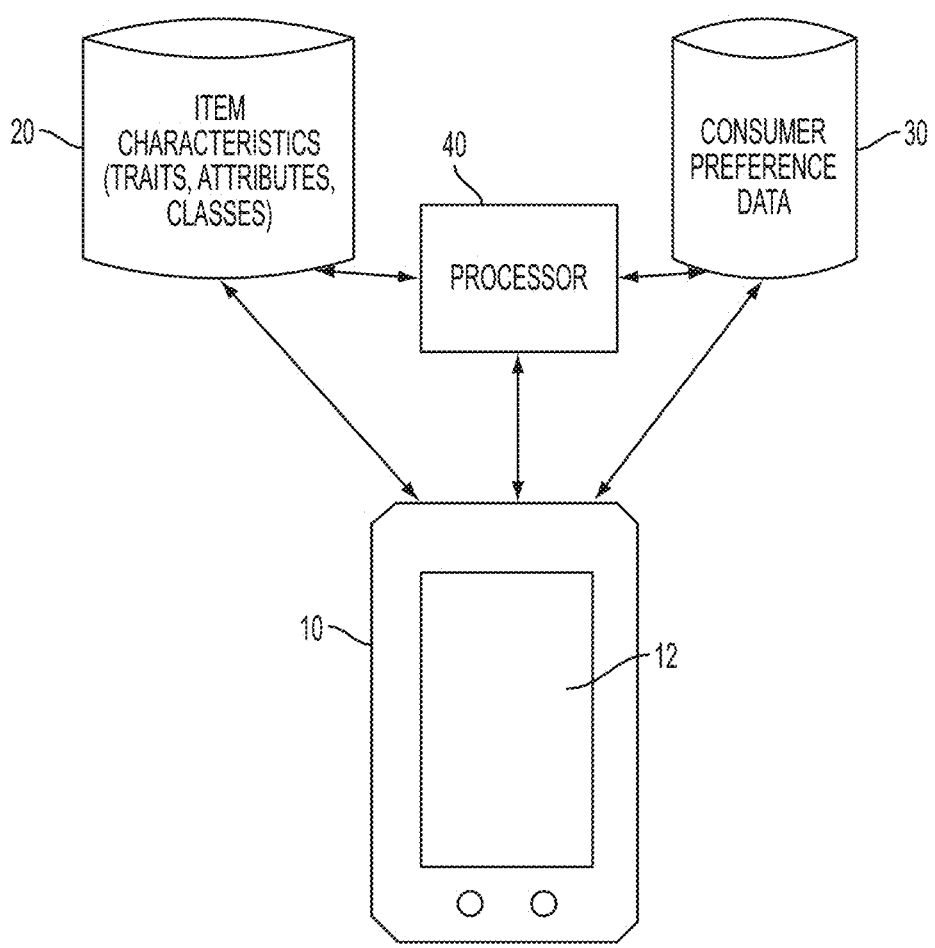
FIG. 1 is block diagram illustrating various elements of a personal taste assessment and recommendation system.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

For the purposes of this application, a "computing device" or "electronic device" refers to a computer or other machine having a processor and tangible, processor-readable memory that together implement one or more operations according to one or more programming instructions. Various possible elements of a computing device are described in reference to FIG. 14.

"Electronic communication" refers to any form of electronic sharing of data and/or instructions, including physically connected or wireless communication, as well as communication that is direct or indirect via one or more networks.

In this document, the phrase "consumable item" is used to refer to any item that a consumer uses and, during use, experiences at least in part via the consumer's senses of taste, smell or touch. For example, consumable items may include food or beverage items such as wines, spirits, beers, cheeses, tobacco products and the like. Although the examples below often are described in the context of wine, other consumable items may be associated with the methods and systems described below.

In addition, although the examples below describe the invention in the context of wine or other consumable items, the invention is not limited to use in connection with items that must be literally ingested by the user. Applications of the invention include any product that includes sensory traits (and in some embodiments, products that the consumer may taste, smell, or touch—optionally in addition to see and/or hear), the immediate perception of which is a source of utility to the user and/or forms the basis for the user's preference for the item. Examples include perfumes, colognes and clothing.

The system described in this document creates a group recommendation by merging certain information. Unlike group recommendation systems of the prior art, the system described in this document merges preference models for individual users into a group preference model. Unlike preference profiles that exist in prior art systems, a preference model comprises a function, such as a regression function, that portrays a specific form of a systematic dependence between item ratings and the item traits and/or attributes and/or their rating context. A systematic dependence may take the form of trending, focal, polarizing and/or consistent patterns of rating dependence. In the present embodiments these patterns of systematic dependence may include a trending contrasting type, a focal contrasting type, a consistent type and a polarizing type as described below. In contrast, prior preference profiles generally contain lists or relationships between items and ratings.

Thus, preference profiles of the prior art contain information merely describing what items various users prefer, while preference models described in this document contain information that allows a system to determine how or why a user prefers various items by determining the item characteristics that various users prefer. Example preference models and methods of developing one or more preference models are described in more detail below.

In some embodiments, preference models of the consistent rating dependency type are used. The list of merged preference models may be ordered according to a social welfare function of each merged preference model, or by giving precedence of the merged preference model appeal to one or more users in some established order. The system may use the merged preference models to make recommendations by using their merged item descriptions to identify recommendable items.

FIG. 1 illustrates certain functional elements that may be included in a personal taste assessment and recommendation system for a group of users. An electronic device 10 containing a processor, programming instructions, a tangible computer-readable memory, and a user interface 12 may implement any of all of the system's functions for each user. The electronic device 10 may be, for example, a smartphone (as shown), a computing device such as a personal computer, a laptop or tablet computer, a television set, a gaming device, or any other device having the elements described above. The user interface 12 may include elements for user output, such as a display or audio output. The user interface 12 also may include elements for input, such as a keypad, microphone or camera. Optionally, two or more of these elements may be combined, as in a touch-screen display which provides both input and output functions.

The electronic device 10 may be in communication with a database 20 containing traits and other information about numerous items of varieties of items that are candidates for inclusion in various users' preference profiles for rating by users, or for recommending to users. In some embodiments, the items in the database may be curated, that is, selected by one or more professionals having experience in the field of the items. Some or all of the trait values may be assigned by the curators. Although FIG. 1 illustrates the database as including wine data, it may include data for other items that may be perceived or chemically or tactilely sensed by a human, such as wines, spirits, cheeses, baked goods, frozen foods, pre-made entrees, restaurant dishes and other consumable items. Alternatively, the database may include trait values for products that are perceived through the sense of touch or smell, such as clothing, cosmetics and perfumes. Although some products also may be perceived by the senses of sight and/or hearing, for this purpose of this disclosure a trait must be associated with at least one of the following senses: taste, smell and touch. For the purpose of this discussion, a consumable item database and wine data will be used as examples.

The electronic device also may be in communication with a memory on which is stored a set of consumer ratings 30, which are described in more detail below. Some portions of the product database 20 and consumer ratings database 30 may be stored in the electronic device's memory. However, for a group recommendation system, at least a portion of the databases will also be stored on an external memory, as in a cloud storage application, and the device may access and/or send updates for the data via a communications network such as a mobile phone network or the Internet.

The databases may directly communicate with the electronic device 10, or a remote server 40 may communicate with the databases and send data to and from the device. Any of the steps described in this document may be performed by the remote processor 40, the electronic device 10, or a combination of those and other processing devices. Thus, references in this document to "a processor" may include a single processor, a group of processors, or any processor within a group of processors unless the context clearly states otherwise. Any or all of the steps described below may be implemented as the processor or the device's processor executes programming instructions that are stored in a memory. For example, the electronic device may be programmed with a software application that performs any or all of the functions described in this document.

The item database 20 may be a curated database of characteristics of the items that may allow the system to serve as a surrogate for a human expert. In some embodiments, the database may include traits, attributes and/or classes for the items, each of which are described below.

Traits are item properties that are subjectively observed or detected by a human's chemical senses (taste or smell) or sense of touch or sight, or a combination of such senses. Traits relate to the sensory perceptions they elicit, and may include aspects of taste, texture, flavor, aroma, perceived sensory similarity or physical appearance. For example, a wine may perceptually portray itself with the traits of being ruby red and fruit-forward, with vanilla notes and tasting like a typical California Cabernet Sauvignon. Trait values are meant to capture the portrayal of an item's perceptual properties in a manner that permits their systematic analysis. To do this a trait will have an associated value which may be: (i) a quantitative measure such as represented by a numeric or ordinal data type (e.g., a number on an interval scale, such as 1 to 5 or a grade, such as Low, Medium, High); (ii) a value that may indicate status or membership such as a categorical indicator, exclusive or non-exclusive (e.g., in the case of an exclusive binary situation, 1 or 0 or in the case of a non-exclusive ternary indicator, strawberry and vanilla but not citrus); (iii) class indicators consisting of a categorical indicator of class membership and a quantitative measure of membership strength. Examples of categorical, quantitative and class trait names in the context of wine are Vanilla Flavor, Fruit Intensity and Napa Cabernet Style respectively. In other embodiments the traits may not have unique associated values but instead have a range of values. Traits of the same name may also have multiple forms of associated values such as a numeric and ordinal representation of a quantitative aspect of a trait.

Attributes are characteristics that are fixed and do not change in any part based on sensory experience, i.e., they are independent of sensory experience. For example, in the case of wine, attributes can be grape, geographic place or region of origin, climate descriptor, vintage and the like. As with traits, attribute values can be represented by quantitative measures, by indicators of category membership or by classes.

The determination of what item characteristic constitutes a trait versus an attribute turns solely on what that characteristic portrays and not on how a value for it is obtained. If a characteristic portrays in any part how an item tastes, smells, feels, looks or sounds then that characteristic is a trait. Thus, even if the intensity of a wine's fruit expression was computed as a function of the wine's attributes, e.g. grape composition, terroir, climate and wine making methods, such a value would be ascribable to a trait. Also, in cases wherein auxiliary item characteristics are computed (see later description), any such characteristics would be considered traits if data derived from a sensory experience entered into the computation. This is because, as defined above, such a characteristic would not be independent of a sensory experience.

Classes are a data type that can be used to portray relatedness among items. This relatedness may be captured by elaborating classes into a tree-like hierarchy. For example, a set of classes formed by a country's boroughs, cities, counties and states can be used to portray the geographic relatedness among the residents of a country. Residents in one borough are related to residents in another borough by virtue of all being residents of the same city. Residents of a city and non-city residents of a county are all related by the fact that they are all residents of the same county. Next, all county residents are related through their mutual residency in the same state and all state residents are related to each other because they all reside in the same country. The boroughs form the base classes of such a geographic hierarchy and the higher levels of this hierarchy are formed by compounding together related lower level classes. The class formed by all residents of the country constitutes the apex of the hierarchy. Such a tree-like hierarchy of classes may be used to portray the patterns of relatedness, for example as defined by perceptual similarity, among items. A hierarchy of classes may also be used to capture non-perceptual aspects of item relatedness by virtue of their non-sensory properties.

In this document, the item traits and attributes collectively may be referenced as characteristics. Throughout the document the "and/or" enumeration of these item characteristics is used to indicate that whatever is being described is applicable to any or all combinations of item trait and attribute values. Sometimes, for brevity, the term item characteristics may be used, and in such cases it is to be understood to refer to any and all combinations of the aforementioned item properties. When, due to inadvertent omission, some but not all of the types of item characteristics are referenced, it can be assumed that whatever is under discussion is applicable to all types of item characteristics if their absence lessens the applicability of the described process.

In some embodiments, the traits may be provided by an expert in the field of the relevant items, such as a sommelier in embodiments that involve wines. Traits may have a binary value (e.g., detected or not, present or absent), while others may have an intensity measure (e.g., on a scale of 1 to 5). For example, wine tastes and textures may be captured by quantitative data types that provide a numeric measure on a fixed scale that relates to the degree of expression of a particular trait. The wine flavors may be captured by binary forms of categorical variables that show whether or not a particular flavor is deemed to be present in the wine. For example, the flavor vanilla may either be detected or not. Wine styles may be captured by a class data type which itself, is a combination of a quantitative and a categorical variable. In a class, a categorical data type is used to indicate membership in a given class and a quantitative data type is used to indicate the strength of class membership, e.g. on a scale from 0 to 1. For example, given a set of perceptual wine styles classes, e.g., California Cabernet, Napa Cabernet and Sonoma Cabernet, a red wine may be indicated to have membership in the California Cabernet and Napa Cabernet classes with membership strengths of 1.0 and 0.8 that, respectively, indicate the degree of taste similarity between the wine and the tastes that the style classes typify. The associated values of any or all of the sensory traits may be objectively determined by one or more experts, such as members of a human tasting panel.

Some traits also may have one or more corresponding non-sensory representations, i.e. attributes, reflecting a characteristic that is also perceivable by the human expert. For example, a wine's alcohol level may have an attribute value in terms of percent by volume, either as determined analytically, as reported or as estimated by a wine expert tasting the wine. However, the database also may capture a measure of how much alcohol is actually perceived by the human expert. This is because the perception of alcohol can be affected by other taste, texture and flavor traits of the wine. Thus, the embodiments described in this document enable the system to create a profile and make recommendations based on perception of traits such as taste, texture or flavor, rather than merely on an actual objective degree of expression of those traits. Note that in cases where such perception may be approximated from the values of attributes, the result is still a representation of a trait value even if it was not derived from trait values. This is because the property of being a trait is lodged in what is being portrayed and not in how a value is assigned to it. In some embodiments, certain characteristics may be excluded from the database, or they may be captured in the database but not used in the methods described. For example, characteristics such as aromas, expected retail price, country of origin or other characteristics may or may not be considered.

Before values can be attached to class data types, the classes themselves must be defined. As described earlier, the elaboration of classes into a hierarchy may be used to capture information about the relatedness of items. The approach used in this embodiment was to take relatedness to mean the similarity between classes. In the case of wine class traits for example, a wine class trait hierarchy may be created by assembling a set of base classes representing all of the important, perceptually distinct styles of wines. These base classes and their perceptual properties may be determined a priori by a wine expert. Higher level classes may then be assembled by combining groups of the wine style base classes in accordance with their mutual perceptual similarity to each other and mutual perceptual dissimilarity to the rest of the base classes. This resulting set of higher level classes may be called wine style families. The wine style family classes may be combined into further higher level classes, that may be called wine style family groups, on the basis of their mutual perceptual similarity with each other and dissimilarity to the rest of the wine style families. Alternatively, a wine class trait hierarchy may be created by clustering together a set of given base classes on the basis of numerical computations of pairwise class similarity. For example, if the base classes are assigned quantitative and categorical trait values then a variety of methods may be used to compute pairwise class similarity. In one such method, these trait values may be treated as distances along orthogonal directions in an abstract vector space and the dissimilarity between classes taken as proportional to their separation in that space. Using such an approach a clustering algorithm may be used to progressively combine pairwise similar classes, starting with the base classes, into a hierarchy of classes. A higher level class is formed with each combination of classes that comprise the hierarchy.

For example, FIG. 9 shows an example of a class hierarchy built by clustering wine style base classes. The left part of this illustration shows the outline of the red wine class hierarchy that was built on a set of 15 wine style base classes. The vertical line segments in this diagram connect together classes. The rightmost lines in the diagram indicate the next to the lowest classes formed by connecting pairs of base classes. The formation of intermediate level classes can be traced out by following the pairwise connections of lower classes linked by the vertical lines. The right part of the illustration provides information about the traits and attributes that were associated with each wine style base class. The attributes are: the grape composition category and country of origin. The quantitative traits are rendered as miniature bar graphs: fruit intensity (FI), mineral intensity (MI), body (B), acidity (Ac), oak intensity (OI) and tannin intensity (TI). The indicated categorical traits are listed in the Flavors section and include the fruit (Red or Black) and various other flavors. For illustrative purposes the base classes were explicitly combined into four higher level classes the divisions of which are indicate by the dotted horizontal lines. The similarity of base class traits and attributes within each of these high level classes is readily apparent as are their dissimilarities across these classes.

In general the assignments of items to classes and the determination of the strength of that assignment, here taken as similarity, may be: (i) made by human experts; (ii) computed on the basis of the item's properties; or (iii) obtained from semantic similarity analysis of written material about the item, e.g. an item's written description, review or bibliographic data, or (iv) a combination of any of the preceding items. The previous paragraph described one method for determining pairwise item similarity on the basis of item properties, e.g. taking the item traits and/or attributes as vector values in an abstract space. Another systematic method deduces the similarity relationships among items via link analysis or via graph relations such as may be done to process the connections among items such as web pages or documents into measures of similarity. Where such systematic methods fail to produce the desired character of similarity, human judgment can be used to generate all of the required class assignments and similarity measures. For example, experts can manipulate tokens representing items in a one-, two- or three-dimensional space such that the separation between those tokens is representative of their dissimilarity. In general, assignment of items to classes may be made for items having sufficient similarity to the classes.

Returning to FIG. 1, the consumer preference database 30 may include identifiers for products that each consumer has perceived, the consumer's ratings for those products, contextual information and extant preference profiles. The ratings and contextual information will be described in more detail below.

Figure 2:
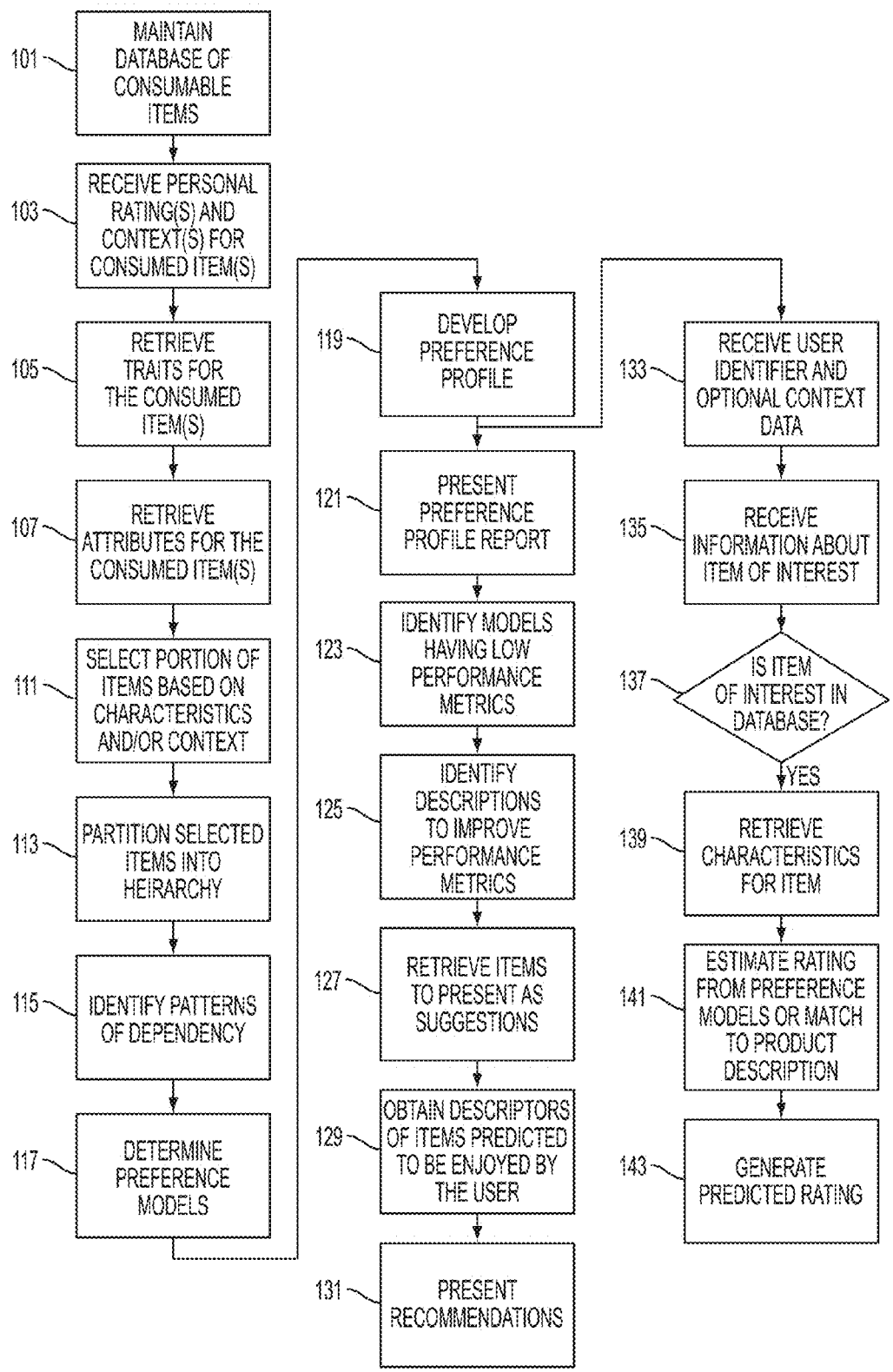
FIG. 2 is a flow chart illustrating steps that may be performed by a taste assessment and recommendation system.

FIG. 2 is a flow diagram that illustrates a method of assessing a person's personal taste for consumable items, for obtaining item suggestions and recommendations, and for obtaining rating predictions, which may be implemented by a system such as that shown in FIG. 1. The system may maintain, or it may access via one or more communications networks, a database of items 101 that may be rated, such as consumable items. Each item in the database is associated with one or more sensory traits and optionally with one or more attributes. The system may present each user with a user interface through which the system will receive a person's rating for one or more of the items 103 that the person has perceived. The rating may include an ordered rating such as a number from 1 to 5; a grade such as A, B, C or D, or a descriptor such as "love it", "like it", "it's OK" (or "so-so"), or "don't like it." In some embodiments, the rating may be a single response, such as those listed in the previous sentence. Optionally, the rating context may include responses to one or more questions about the environment that in which the person experienced the wine, such as "dinner out," "at a friend's home," "home with family," "free," "celebration," etc. or may include information generated by the system from geotag information received from the input device, such as GPS coordinates. In various embodiments, the context may include a date on which the consumer rated the item or on which the system received the consumer's rating. The system may access the item database to retrieve values for the sensory traits that are associated with the perceived items 105. The system also may retrieve the attributes for each of the perceived items 107. For example, in the context of wine, the attributes of these wines may be any or all of color, grape(s), style, growing region, or year. Optionally, in addition to the wine characteristics already in the database, selected traits and/or attributes may be contingently combined to form additional auxiliary traits, attributes or classes. The association of items and traits with items will be maintained in the item database (e.g., the database 10 of FIG. 1). The system may select a portion of the perceived items for use in profile construction on the basis of the item traits and/or attributes and/or rating contexts 111. For example, the system may select only red wine items in order to develop a profile for red wines or for red wines consumed for vacation rating contexts in order to develop a profile for red wines consumed in a light hearted setting.

The system will partition the selected items into a variety of subsets based on item traits and/or attributes and/or rating context data 113. This partitioning permits the system to develop preference descriptions having a range of specificities, i.e. with what particular combination of types of items and context was the preference manifested. The system will analyze the person's rating data in each item subset created by the partitioning process. It will identify one or more patterns of dependency 115 between the user-assigned ratings of the items in the subset and one or more traits and/or attributes and/or rating contexts of the rated items. Note that the "user" may be the person who rated the items, or it may be someone who is accessing the system with user information, such as a sales representative or restaurant employee.

The system will determine one or more preference models 117 for the user using the subsets of items created by the hierarchical partition process. Suitable preference models are discovered on the basis of their ability to support various types of associations between the ratings of the selected items and their item characteristics and/or context data. A preference model comprises a function, such as a regression function, that portrays a specific form of a systematic dependence between items ratings and the item traits and/or attributes and/or their rating context. A systematic dependence may take the form of trending, focal, polarizing and/or consistent patterns of rating dependence. In the present embodiments these patterns of systematic dependence may include a trending contrasting type, a focal contrasting type, a consistent type and a polarizing type as described below.

In addition to the identity of the rating pattern, the model includes performance metrics that describe the degree to which these associations are supported by each item subset and other metrics that describe other aspects of that association specific to that model. Each model also has associated with it the values of their item characteristics and/or context data that determined the inclusion of the items into the analyzed subset. The model also may include the identity of the item characteristics and/or rating context data supporting the association between it and the pattern of ratings.

Suitable preference models are may be discovered on the basis of their ability to almost support various types of associations between the ratings of the selected items and their item characteristics and/or context data. In some cases it may be determined that such an association may be supported if additional ratings of specifically characterized items are obtained. Identifying such preference models may form the basis for suggesting additional items for the user to rate. Thus, preference model identification may encompass extant and/or potential (latent) patterns of dependence.

A preference profile is developed 119 for one or more consumers on the basis of those preference models whose performance metrics indicate that the item characteristics and/or context data support a rating dependency pattern. The preference profile may be a collection of preference profiles and also all of the assembled preference models. Each profile is compiled to convey preference to a given degree of specificity and completeness. This may be done by combining preference models in various ways and measuring, among other things, the specificity, multiplicity, completeness, uniqueness, consequentiality and informativeness of the preference description represented by the assemblage. These measures, described later in this text, capture various qualities of the preference profile description that are of importance to the user. Collectively they determine its salience. These encoded representations of the user's preference may be stored in the consumer preference database for further use along with all of the preference models.

Several things can be done with the preference profile developed by this system or, equivalently, an earlier developed profile retrieved from the consumer preference database. The system may present information from a user's profile in a human readable preference profile report 121, such as in a document, electronic file or user interface screen, and/or it may use the profile to generate suggestions 127 or recommendations 131 for the person or make predictions of item appeal 143. Recommendations are items that the system identifies as being likely to be enjoyed by the user based on the user's preference profile. If desired however, the user can request recommendations for items having any given level of appeal, for example to check to see if their taste for previously uninteresting items has changed. Suggestions are items that the system suggests that the user sample and rate to help the system build a more accurate preference profile.

For example, in one embodiment the system may evaluate the performance metrics of the assembled preference models and identify those having low or below acceptable levels 123. Since these metrics can be diagnostic of specific problems it is possible to obtain descriptions, i.e. values for traits, attributes and/or classes, for items that, when rated, can be expected to improve the performance metrics 125. The system would then access the item database to retrieve items whose properties match the item information associated with those items and present them as suggestions 127. For another example, in one embodiment the system may review the preference profiles and process their contained preference models to obtain the traits and/or attributes for which the patterns of preference in the profile indicate the person would rate such items the highest, disregard the items characteristics for which the patterns of preference in the profile indicate the person would rate such items the lowest. The system would then access the item database to retrieve items whose properties match the item characteristics associated with appealing items and present them as recommendations 131. In another embodiment the universe of recommendable items is constrained to those whose traits and/or attributes satisfy a user-supplied criterion such as user-supplied parameters (e.g., price), or one or more situational parameters (e.g., available inventory at a retailer or distributor or pairs with a certain food). Optionally, for a third example, the user may present an item that the user has not yet evaluated and request an assessment of the item wherein the patterns of preference in the user profile are used to generate a prediction of the user's rating for the unevaluated item 143. As will be described below, the suggestions and recommendations can be made for an individual user, or to a group based on a collection of preference models and/or profiles for members of the group or a collective group profile made up of various members' preference models.

Figure 3:
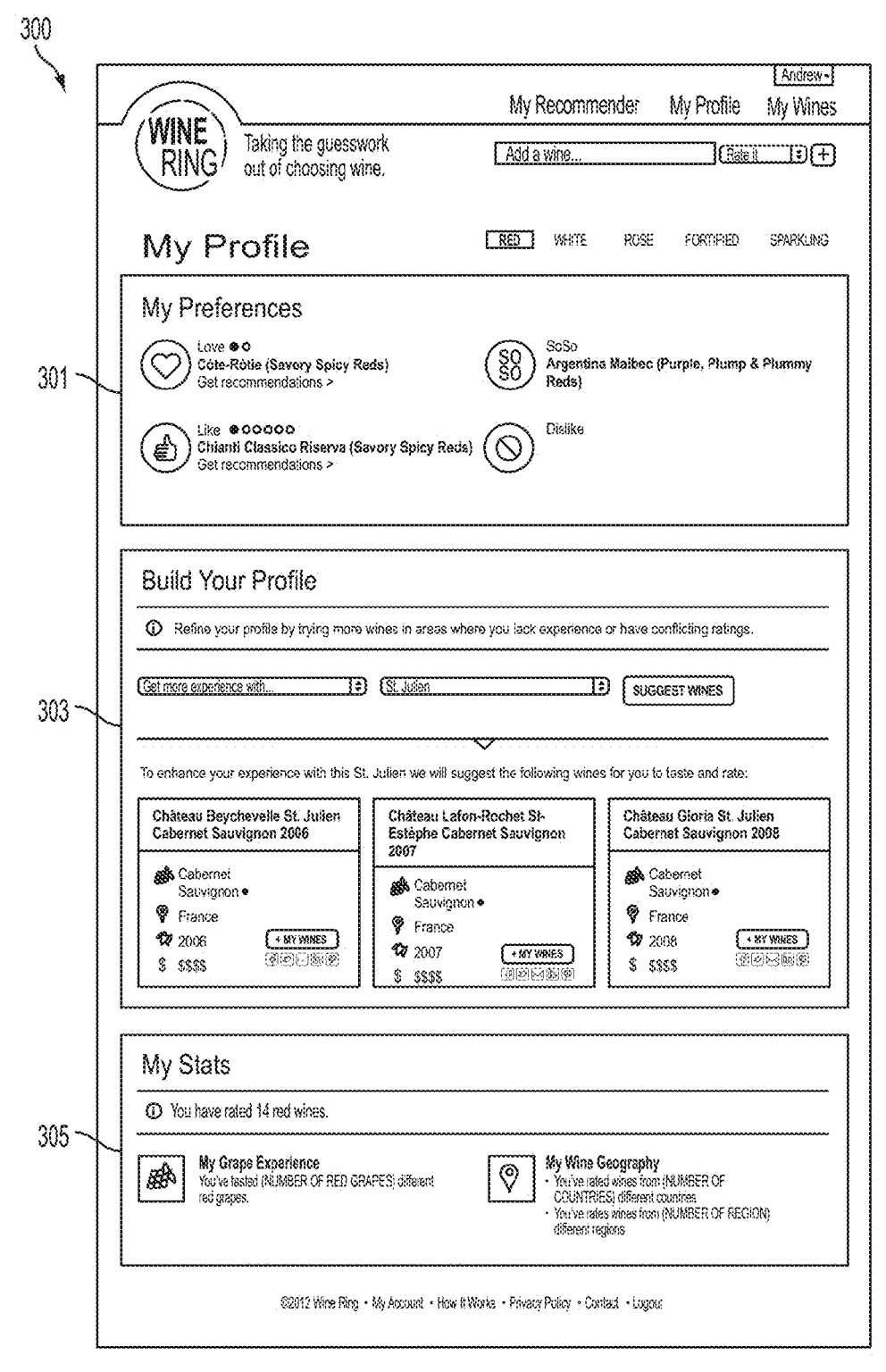

The preference profile may include information about associations between item characteristics and/or context data and the contrasting, consistent and polarizing patterns of ratings. These patterns describe those traits and/or attributes and/or classes that explain ratings over a range of relatively higher and lower values, or which pin ratings to a circumscribed range of values, or which define a split in the pattern of preference. As noted above, some or all of the preference profile may be presented to the user by displaying, transmitting, printing or saving a report 121. An example of such a user interface 300 that outputs such a report is shown in FIG. 3. As shown, the report is presented as an electronic user interface and includes a preference section 301 that identifies items or classes of items and expressions of degrees of preference for each listed item or class. The report may also include a profile builder section 303 that provides the user with suggestions of items to sample and rate to help improve the quality of the user's profile and/or the group's profile. When a user indicates that he or she has sampled or is ready to rate the item, the user interface may present, on the same screen or one or more different screens, a rating field 310 through which the user may input and the system may receive the user's rating for the item. This profile builder function will be described in more detail below. The report also may include a profile statistics section 305 describing quantitative measurements of the user's profile or a group's profile or collection of profiles, such as a number of items rated, a number of items rated within a particular class, and/or a number of items rated that share one or more common attributes. The report also may include a characterization of the user's or group's level of experience with a class or other group of items, such as a percentage or other measure of the possible items within a class that the user has sampled.

The report need not include all of the identified preference traits and/or attributes and/or context data. Instead, the system may determine a subset of salient traits or attributes or context data for inclusion in the preference profile using any possible selection criteria. The subset may include a first group of item descriptions and/or contexts under which the user exhibits a contrasting pattern of preference, and a second group of item descriptions and/or contexts under which the user exhibits a consistent pattern of preference and a third group of item descriptions and/or contexts under which the user exhibits a polarizing pattern of preference.

Returning to FIG. 2, as noted above the system also may recommend 131 one or more items that the person or group has not yet rated. The recommendations may be determined based on items that are in the database that have that have the characteristics consistent with the user's preferences under the conditions specified by any given contextual criterion. For example, when recommending an item the system may access the person's taste profile and retrieve a set of the item characteristics associated with a high range of ratings, then access the item database to identify at least one item having one or more characteristics that correspond to the characteristics for which the user has exhibited a positive preference, while omitting those items having characteristics for which the user has exhibited a negative preference, i.e. low ratings. Optionally, the person may be permitted to identify characteristics of recommendable items to further narrow the selection to include or exclude items that have the identified characteristics. Recommendations may also be made for previously rated items. For example, the user may request a recommendation for an item that is known to be appealing but which also satisfies additional criteria, e.g. price or suitable for pairing with a given food.

Alternatively, recommendations may also be obtained by first selecting those candidate items that satisfy any provided criterion for item characteristics, e.g., as described in the previous paragraph above, and then submitting the items to the rating prediction functionality used for predicting ratings. All items whose predicted ratings matches the values consistent with the appeal specified for recommendation, e.g. have high ratings, are candidates for presentation to the user. The choice of approach, identification as described above or screening items by prediction as described here, may have different performance characteristics particularly if the item database is very large.

Figure 4:
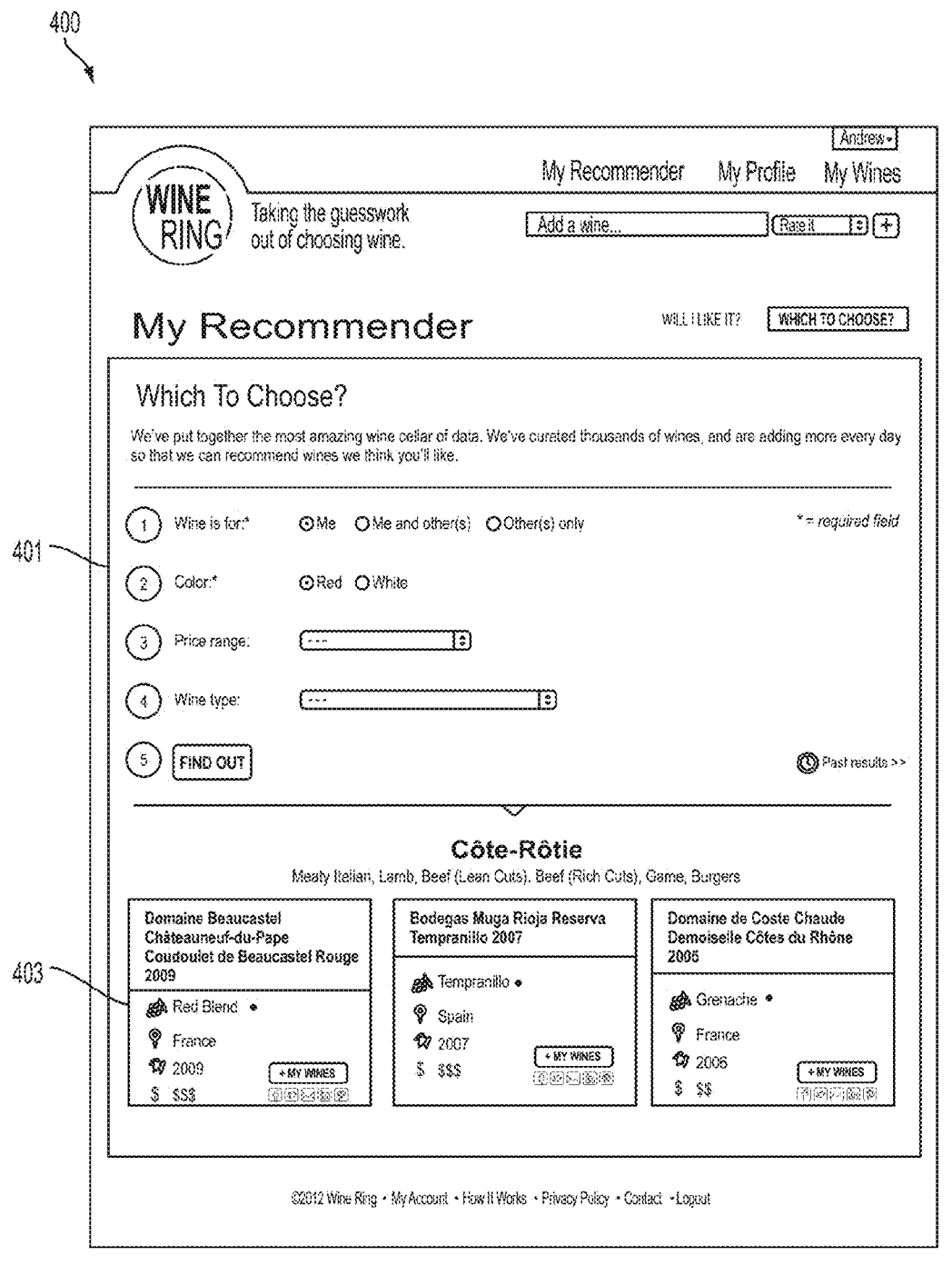

An example of a user interface 400 that provides recommendations is shown in FIG. 4. The interface 400 includes one or more selection fields 401 through which the user may enter or select various criteria that the recommended item must satisfy in order for the system to recommend it. The criteria may include, for example, one or more traits, attributes, or other characteristics such as color, price range or maximum price, or type. The criteria also may include a context such as a food pairing or a type of event. When generating the recommendation, the system may require the recommended item to satisfy all of the criteria, some of the criteria, at least a baseline set of criteria (such as color and price range), or some combination thereof. The user interface may also include a recommendation field 403 through which the system presents the user with recommendations based on the criteria and the user's profile.

Figure 5:
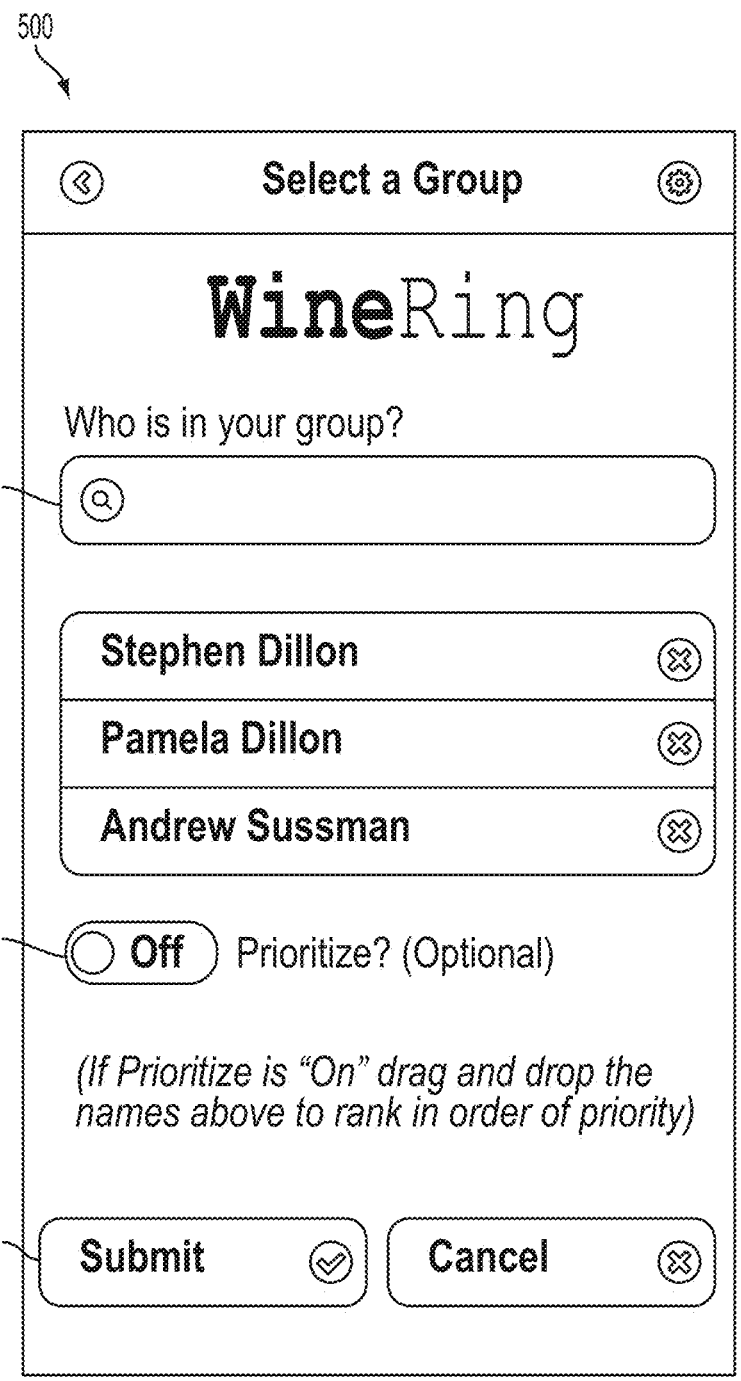
FIG. 5 illustrates an example of a group definition interface.

Optionally, in a system where the recommendation is for a group, the system may offer the user the ability to select a group or define the members of a group. For example, as illustrated in FIG. 5, a group profiling system may include a group definition interface 500. The interface may include a user input field 501 in which the user may identify one or more persons to add to a group. The input field 501 may display a selectable list of persons. Or, it may allow the user to enter text via typing or speaking a person's name, in which case the system may search the available user profile data to determine whether a profile comprising one or more preference models is available for the identified person. If so, the user may add the identified person 503 to the group. Optionally, the system may include a prioritization selector 505 in which the user may assign different priorities to different members of the group. This can be done in any suitable manner, such as by ranking the group members, by assigning weights to the group members, or by other means. If prioritization is used, then when creating a group profile and/or making group recommendations as described below the system may assign higher weights to the preferences of group members having higher priority, and lesser weights to the preference of group members having lower priority. When the user is satisfied that the group is complete, the user may accept 507 the group definition. Upon receipt of the acceptance, the system may create a group profile or aggregate the profiles of group members as described below.

In general, a recommendation system uses data for items rated by a user to identify one or more other items to recommend to the user. Recommendation system performance can be negatively affected by, among other things, a relative paucity of ratings for, or an inconsistency in the ratings of, certain types of items or subsets of items. Thus, the presently-disclosed system may also identify not-yet-rated items that, if rated, are expected to have some utility to the recommendation system itself. The user may or may not like the items, so the items may not necessarily be "recommended" for the user, but if the system were to receive data regarding the user's preference for the items, the system could use that data to improve its future recommendations for that user. Here, the identification of items that are of direct utility to the system is called "suggesting."

Thus, when suggesting item(s), the system may proffer an item that will help the system improve the user's and/or group's taste profile. For example, the system may assess the user's experience with a particular class or other group of items (referred to in this discussion as a category) and make suggestions for additional tastings that will help the user get more experience with items within the category, resolve conflicting information about preferences within a category or resolve conflicting information about the rating for a particular item. For example, returning to FIG. 2, the system may assess a user's experience 123 with a category of wines, such as "Chianti" or "South American Shiraz." The system will apply any suitable algorithm to determine an experience score for the user's experience level with items of that category, wherein the algorithm includes variables that include a number of wines (or other items) tasted in the category, along with the relative variety of wines (or other items) tasted within the category. For example, if a user has tasted ten wines within the category, if the wines all have varying traits and attributes then the system may assign one point for each wine and give the user an experience score of 10 for that category. However, if eight of the wines tasted are have very similar attributes and/or traits, may assign a number less than one for the similar wines, or the system may assign a maximum total number (e.g., 3) for the similar wines so that the remaining five similar wines are not counted in the calculation of the user's experience score. The score may be a numeric score or a word-based or graphic descriptor based on a numeric score. For example, a relatively high score may show that the user has "significant" experience a category, while a low score may show that the user has "little" experience in a category.

Thus, the system may identify items 125 from its database that are within the category and suggest 129 that, if tasted and rated, those items will improve the user's experience score for the category. These may include items the user has not yet rated and which have attributes and/or traits that the user has not yet experienced in the user's rated wines, or which the user has experienced less than other attributes and/or traits as indicated by wines rated by the user. As an example, if the user has tasted eight full-bodied, fruit-forward Chiantis but only one medium-bodied Chianti, it may suggest 127 a medium-bodied Chianti to the user. The activities to be carried out in the suggesting process may depend upon the implementation of the recommendation system. Additional details about a suggestion system will be presented below.

In some embodiments, the system may provide a user with an ability to gain more experience with a particular category of item and improve their profile with respect to that category by supplementing the data in their profile for rated items in that category. For example, as shown in FIG. 3, the system's user interface 303 may provide the user with a selectable list or other set of categories. When the user selects a category from the list, the system may suggest one or more items that, if rated by the user, will improve the user's profile with respect to that category, or with respect to one or more characteristics of items within the category. The items may be items that will improve the user's experience score, as described above.

The system may also identify items within the category having attributes and/or traits for which the user has provided ambiguous ratings. For example, ambiguous ratings in the context of model based on a consistent rating pattern would be manifested by a low rating homogeneity. In the context of a model based on a contrasting preference, ambiguity would be manifested by ratings not clustered closely enough around the trending or focal rating patterns. This ambiguity may be measured a fitness metric that portrays how well these ratings fit the user's preference model. In cases where the fitness metric is marginal or below a threshold then having the user rate additional items may improve the model fitness.

For example, when seeking to fit a consistent pattern of preference to a subset of items, a user could have rated two items as "like" and two items as "don't like." In such a case there would be insufficient rating homogeneity to indicate a consistent pattern of preference. However, if the fitness metric for this model is near the acceptance threshold, it may be appropriate to suggest that the user rated one or several items that are of the same category and/or that share a same attribute. For example, if the items sampled were atypical, or if the context of the item experience were atypical, then such cases repeating the item experience may reveal a preference that was masked by unusual circumstances. In the case of a preference model based on a consistent preference, the system may identify from its database additional items to suggest 125, having the same characteristics as the partitioning process used to construct the subset of items associated with the item.

More generally, for other types of preference models, as will be described later, other methods can be used to identify other items to suggest to the user to help resolve the apparent conflict in the user's preference model. For instance, in the case of a trending rating dependence pattern, where the fitness metric is degraded by ratings for items having particular characteristics, then the system would suggest further items of the same sort. Additional ratings would resolve the question of whether the lack of model fitness was due to atypical in the item experience or to intrinsic taste of the user.

The system may also recognize a case wherein the ratings for one or more particular item(s) appear to be outliers with respect to the predictions of the item ratings made on the basis of the preference model. In contrast to the previous example, the preference model having such outlying ratings will still have sufficient model fitness to merit inclusion in the preference profile. It may be the case that exclusion of such outlying item ratings is what makes the difference between a sufficient confidence in the preference model. However, if these outlying ratings represent atypical experiences of the user with the item, i.e. either an unusual item realization or experience context, then further action can help resolve whether what is being manifested is intentional or accidental preference. The user can be directed to re-experience the outlying items or the experience items to which they are similar and whose characteristics would merit including them in the item subset created by the partitioning process. If the new ratings are inconsistent with those of the outlying items then the outlying ratings can be marked as atypical and eliminated from the preference model. Otherwise, the instance would have to be recognized as an item preference that the profiling system can not yet describe.

In some embodiments, the system may recommend 131 items that the user is likely to enjoy. Recommendation processes will be described below. For example, the system may receive a request for a recommendation. The request may be a specific request submitted by a user. Or it may be an automated command to provide a recommendation whenever a user performs a certain action, such as accesses the application. The request may include one or more criteria, such desired traits and/or attributes, a context, or other information that the system may use to generate a recommendation for one of the items in the database.

Figure 6:
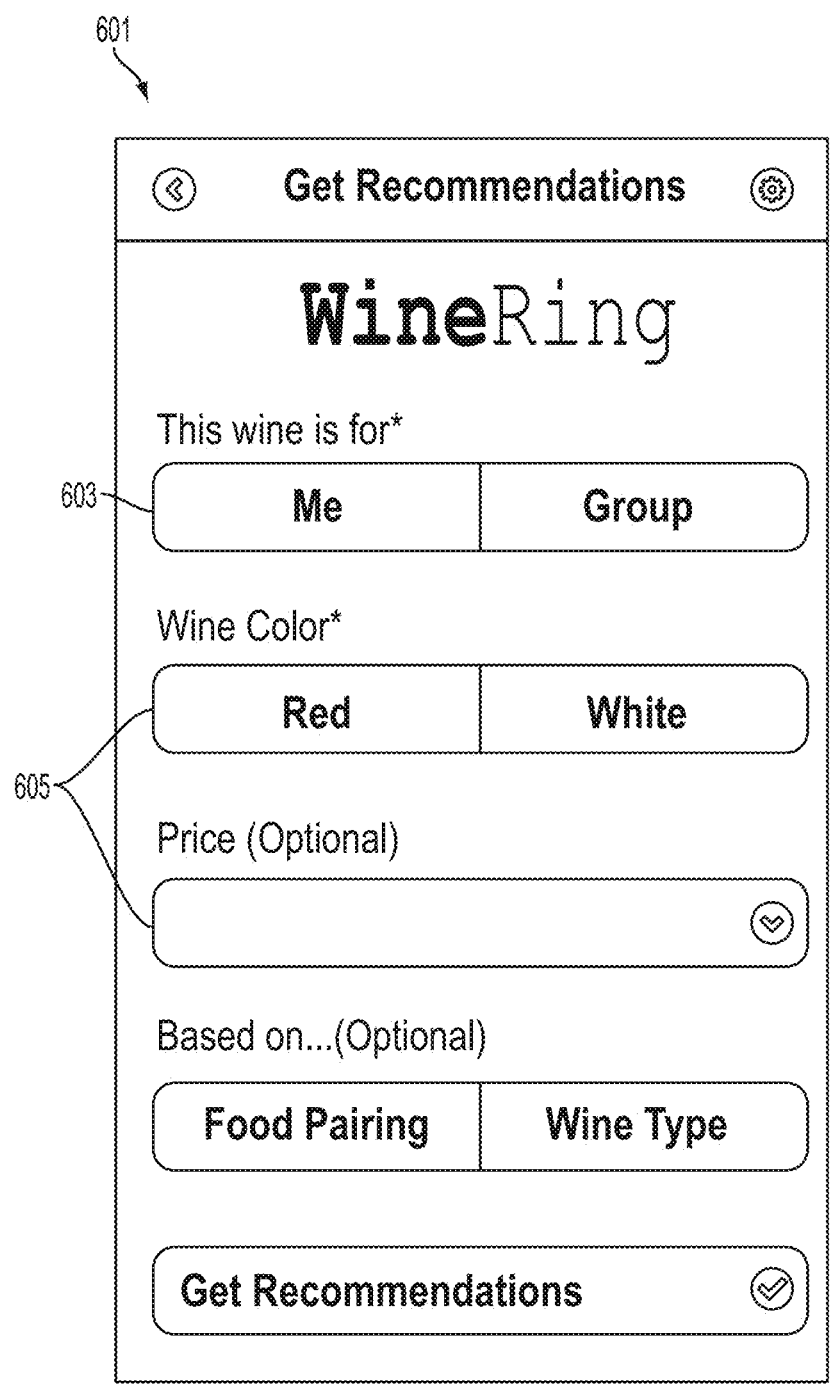
FIG. 6 illustrates an example of a user interface for requesting a recommendation.

An example of a user interface showing this is found in FIG. 6, which shows an example of a user interface 601 through which a user may request a recommendation. The interface may include a context field 603 in which the user indicates whether it wants a recommendation for the user himself or herself, for another user, or for a group. If the selection is for a group, the system may present the user with a field for selecting a preexisting group, or it may provide a group definition interface as shown in FIG. 5. A group recommendation made on the basis of profile constructed by matching and merging the preference models of multiple users as described below. The system will access the user's profile, another user's profile, or a group profile depending on the user's selection. The interface also may include one or more characteristic fields 605 where the user may identify several criteria that the recommended item must (or is preferred to) satisfy. Such characteristics may include type and price, for example.

In some embodiments, a personal taste profile system also may contain a prediction functionality—i.e., a process that allows a user to determine whether the user (or another user) is likely to like a specified item, based on the relevant user's profile data. For example, returning to FIG. 2, a user may be permitted to enter a user identifier 133. The system will use the user identifier to identify a person whose profile will be used for the prediction function. Optionally, the user can provide a context under which the item was, or is to be sampled. Such contextual information may be relevant to the experience of the item for the situation in which the item is to be consumed (e.g., food and wine pairings).

The system will then receive identifying information about a specific item of interest 135. The data may be a serial number, a universal product code, a name or other description, scanned barcode data, a photo of a label that is processed using image recognition technology to extract identifying information, or any other data that the system may use to identify the item. The system will determine whether data for the specific item of interest is available in an item database 137. If so, the system may retrieve one or more traits and/or attributes of the item 139, process the retrieved characteristics through the relevant user's or group's profile 141, and generate and output to the user a predicted rating for the item based on the process 143. The rating dependency patterns of the preferences models in the profile determine how the item characteristics are processed. For consistent patterns the predicted rating is the representative rating of the item subset comprising the model. In the cases of the contrasting and polarizing patterns, the values of the item characteristics and context data (if present) are entered into the preference model, for example as implemented by a regression function, and the result taken as the rating prediction. The performance metrics of the preference model will provide measures of the certainty with which the function's value can be taken as indicative of how the user would rate the item. This metric and optionally others can be used to select from among the predicted values to present as the predicted rating. When no preference model can be matched to the characteristics of the item, i.e. this item would not have qualified for inclusion in any of the subsets generated by the partitioning process, then a prediction can not be made and so an inconclusive result can be returned. An inconclusive result can also occur if the performance metric(s) of none of the preference models indicate that their results are not sufficiently reflective of how the user would have rated the item.

In an example of using the prediction system for wine, a user may use a mobile electronic device to scan a barcode or QR code or capture a photo of the label of a wine. The system may process the barcode data, or extract label data from the photo, using any suitable optical recognition technology. When the wine is identified, the system may access a database of curated wines to determine whether the identified wine is in the database. If the wine is in the database, the system may retrieve from the wine database one or more characteristics of the wine. The system would then process these attributes through the user's profile as described above. These results are then transmitted to the user saying that they are likely to like or dislike the wine, as the case may be. If the results are inconclusive, the system may decline to make a prediction or report that it had an inconclusive finding.

When selecting a user profile, the system may default to the requesting user's profile, unless the requesting user requests that the system access another user's profile. When selecting a group profile, the system may default to a profile of a group of which the user is a member.

In some embodiments, the system may regenerate a new preference profile for a user or group, or it may update an existing profile or group based on new ratings or item characteristics.

In some embodiments, for the purposes of obtaining an item recommendation or for expanding the user's own profile, the system may augment the user's profile with portions of preference profiles from one or more users. Suitable users may be identified first on the basis of their willingness to make their preference profiles available for sharing. Next, an overall similarity score may be computed between the preference models comprising user's profile and those of the users who make their profiles available for this purpose. A first step in computing the similarity score may be identifying which of the user's preference models match those of each of the cooperating users. This is done on the basis of the item subset descriptions of the preference models. The system determines whether the user and the cooperating user share the same preferences for the subset of items in each preference model. In cases where the preference models have matching rating dependence patterns, this can be done by computing the similarity of the model parameters.

For example, in the case of a consistent pattern of preference, by measuring how closely the representative ratings for the item subset compares for each user. In other rating dependence patterns it will depend primarily on the item characteristics that support the rating dependence and the direction of that dependence, e.g. increasing or decreasing ratings as a function of trait intensity and, in the case of focal patterns, the focal zone of item characteristic values. In cases where there are different rating dependence patterns for the same subset of items, then similarity may be computed on the basis of ratings predicted by the preference models of both users for a set of items. This set of items could be comprised of the union of the items rated by the user and the cooperating user. The more closely the ratings of these items are predicted by the models of both users, the more similar their preference for the item subset on which the preference model is based.

A collective preference similarity score may be computed for each cooperating user and those which satisfy a similarity criterion are considered next. Considering only the pool of qualifying cooperating users, the system may identify which of the cooperating users' preference models are not present in the profile of the user. As in the previous step, this may be done on the basis of the item characteristics that determined inclusion of items in the subsets comprising the preference models. The preference models so identified in this process are candidates for either adding to the user's profile or for a basis upon which to make recommendations. Choosing which of these profiles or how many of them to use will depend upon how the system is implemented. One may choose to use only the candidate preference models from the cooperating user whose preference profile was most similar to the user. Other possibilities include using only those preference models whose item subsets are for types of items very similar to, or very different from, the items already rated by the user. However the preference models are chosen, the system may add them to the user's preference profile and generate an augmented profile for the user. Alternatively, the system may add them to the collection of the user's preference models and use the augmented collection to perform a recommendation function. This process may then allow the system, and optionally the user, to identify other users' preference models that are similar to the first user's models for a common collection of types of items. The first user may then assume the cooperating user's preference models for different types of items for which the first user does not yet have a preference model. This process allows a user to bolster their preference profile with the experiences of other, more experienced users who also have similar preferences for the types of items they have in common.

In addition, the system may offer a user the ability to compose a group of two or more selected users and recommend items that, based on the profiles for each of the users, are expected to be liked to definable degrees by each of the users based on a merged profile created from the users' profiles. As used in the document, an item may be expected to be liked by multiple persons so long as none of the relevant users is expected to dislike the item. A recommendation for several users may proceed first matching the item subset descriptions of the preference models from all users in the group. The matching profile models are merged by inverting the rating dependency functions and identifying regions of item characteristic values for which various degrees of rating maximization can be attained for the users comprising the group. This is straightforward in the case of matching preference models based on the consistent pattern of dependence since no function inversion is required. The representative rating associated with the subset of items in the preference model of each user can be directly used. If the ratings for the group satisfy some social welfare function, e.g. no unappealing ratings or an average appealing rating, then the item characteristics used to form the subset can be used to identify recommendable items. In instances where users have no matching preference models one may assume a default rating for the item subset, e.g. So-So, but with a zero level of confidence.

Although the examples described below illustrate retrieval of ratings, item characteristics and user rating context data, any or all of the data points, i.e. item characteristics, ratings or rating context data, may be adjusted, weighted or transformed to replace or supplement the data before the item selection, pattern identification and preference model discovery or at any other point in the profiling, suggesting, recommending or predicting process. This disclosure is intended to cover all such embodiments. As previously noted, the result of any such procedures that incorporates sensorial derived item information, e.g. traits, cannot be considered an attribute because of its dependence on the perception of the item and so therefore may be taken as a trait.

When determining patterns of dependency, some items in the database may be given more weight or emphasis than other items in the determination. Similarly, individual traits and/or attributes may be given more weight or emphasis than others. This may be done by a simple multiplier applied directly to item characteristic values or rating values, such as by multiplying each value for the rated items by a weighting factor or by applying such weights in potentially other manners to values calculated elsewhere in the analysis methods. The system may use context information to determine how to weigh the relevant item characteristics or ratings. For, example, when developing a wine taste profile for the consumer, a wine that the consumer tastes on vacation in the wine's country of origin may be perceived differently than a wine tasted at home. In addition, more recent ratings may be given higher weights than older ratings. For example, ratings that are more than a threshold period of time old may be assigned a weighting factor of less than 1.0 so that they are given less importance in the preference profile than more recent ratings are given. This also helps the system adapt the preference profile to the consumer's changing tastes over time.

Not all of the items rated by the consumer are necessarily passed on to the next step for processing. One or more criteria, based on certain item characteristics and/or contexts, may be required before an item is selected, or a context may be used as a gating criterion for whether an item is considered. For example, in the case of wine, a selection criterion may restrict a preference profile to consider only the past 12 months of wine ratings. Or a user's preferences for wines consumed for pleasure may be profiled separately from the consumer's preferences for wines consumed in professional entertainment.

The traits for some items in the database may be approximated if they have not actually been sensed and/or determined. For example, an expert who has not actually tasted a wine may enter trait values that the expert thinks are representative of similar wines. If so, when a consumer perceives and rates those wines, then when the system builds a preference profile for the consumer those wines may be given less emphasis than wines for which non-approximated or expert-determined trait values are available. This may be done by giving each wine (or other item) a weight, such as a weight between 0 and 1. A weight of 1 may indicate that the system's wine experts are fully confident in their characterization of the wine. A weight of 0 may indicate no confidence. Weights between 0 and 1 may reflect varying degrees of confidence. These weights, or confidence values, may be accessed during the analysis of consumer-rated items. The calculations determining the presence of a dependence pattern may weigh the contribution of each item in proportion to its weight or confidence value in proportion to a weight assigned to the type of item information under consideration. Where there is more than one type of item information being analyzed and where their traits differ, then an overall weight may be determined for that item, such as a mean of the weights, minimum of the weights, or other functions.

In some embodiments, preference model discovery may be carried out in any or all of the following three stages: partitioning, analysis of dependence patterns and assembly of preference models. Partitioning may separate the items into various subsets whose inclusion criteria are based on item characteristics and/or contextual information. Analysis of dependence patterns considers each subset of rated items created by the partitioning process and identifies patterns of dependence indicating the different forms of preference. Assembly of preference models involves identifying the patterns of preference discovered by analysis and appending to them information that further describes the nature of the form of preference. This further information may include the item characteristics and/or context data supporting the pattern of rating dependence, the item characteristics and/or context data that determine which items qualify for inclusion in the subset of rated items that were analyzed, or the confidence or other metrics and statistical measures generated by the analysis. As described earlier, the first step may be applied because it will generally be the case that no single preference profile is applicable across all types of items or across all circumstances in which the items were sampled. Therefore, in addition to analyzing it in its entirety, the data set may be partitioned into various subsets that will be separately analyzed from each other. The third step adds the information required by the profile generation to satisfy criteria such as model certainty and salience.

In some embodiments, the identification of preference models may consider one or more subsets of the selected items and determine which of them exhibit specific patterns of association between the consumer-assigned ratings and the values of one or more item characteristics and context data. This may be done by partitioning the selected items into various subsets and then analyzing the various subsets of the selected wines generated by the partitioning process. The point of partitioning the selected wines is that it is unlikely that a single description of preference is applicable to all of the items perceived by the consumer. It is much more likely that the consumer will have different preferences for different types of items and/or in different circumstances of consumption. By partitioning the wines along the lines of the individual traits and/or attributes and/or contexts, we may find and describe the preferences applicable to each of these types of wines and circumstances. For example, in the example of wines, the selected wines may be partitioned into four subsets according to the season of the year in which the wine was tasted. These subsets may again be partitioned according to the presence and absence of wood flavor in the wines. The types of items for which the user will have a exhibit a pattern of preference will generally not be known a priori. One approach to ensuring that the partitioning process includes such items of preference is to create item subsets on the basis of every conceivable combination of item characteristics and/or context data. A less exhaustive approach entails making assumptions about the types of items for which users will typically form patterns of preference, an approach requiring expertise in the domain of the items and what drives the preferences for those items.

In some embodiments, determining a pattern of dependency may include identifying one or more trending contrasting preferences for the person. Identifying a trending contrasting preference may include: (i) identifying a single item characteristic or a piece of ordinal or categorical rating context data associated with the ratings and by determining that the person's rating trends in concert with the item characteristic or context information; or (ii) identifying two or more item characteristics and/or rating context data and by determining that the item's rating trends in concert with some combination of intensities or values of the multiple sources of information. A rating may be considered to be trending if it exhibits a non-reversing upward or non-reversing downward trend in rating values as a function of the trait values.

Figure 7:
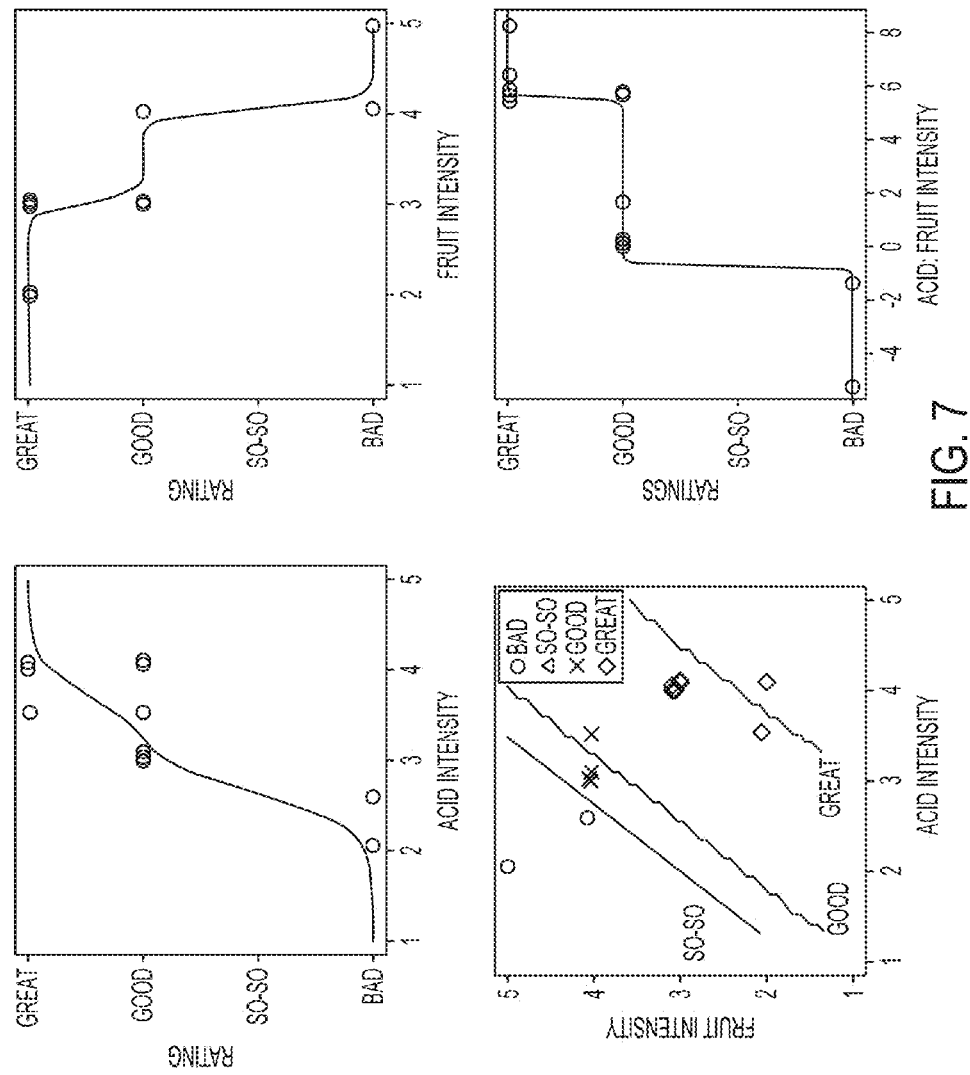
FIG. 7 is a graphic illustration of a first type of contrasting preference.

An example of this for quantitatively valued data is shown in FIG. 7, which shows how a particular person's ratings for wines may increase as the wines' acid intensity trait increases, while the person's preference, as reflected by the rating values, may decrease as the wines' fruit intensity trait decreases. This data indicates that the person has a preference for wines that is driven by two different wine traits. One aspect of preference is driven by a dependence on acid intensity and the other on fruit intensity. This will manifest itself as the user's preference for wines that exhibit both a high acid intensity and a low fruit intensity and a preference against wines that exhibit both a low acid intensity and a high fruit intensity. Identifying a trending contrasting preference may also include: (i) identifying a single categorical or class valued item characteristic or context data associated with rated items by determining that the person's rating trends in concert with some ordering of the categorical values or classes; or (ii) identifying two or more item characteristics and/or context data associated with rated items by determining that the ratings trend in concert with some ordering of the Cartesian product of the categories and/or class values.

Figure 8:
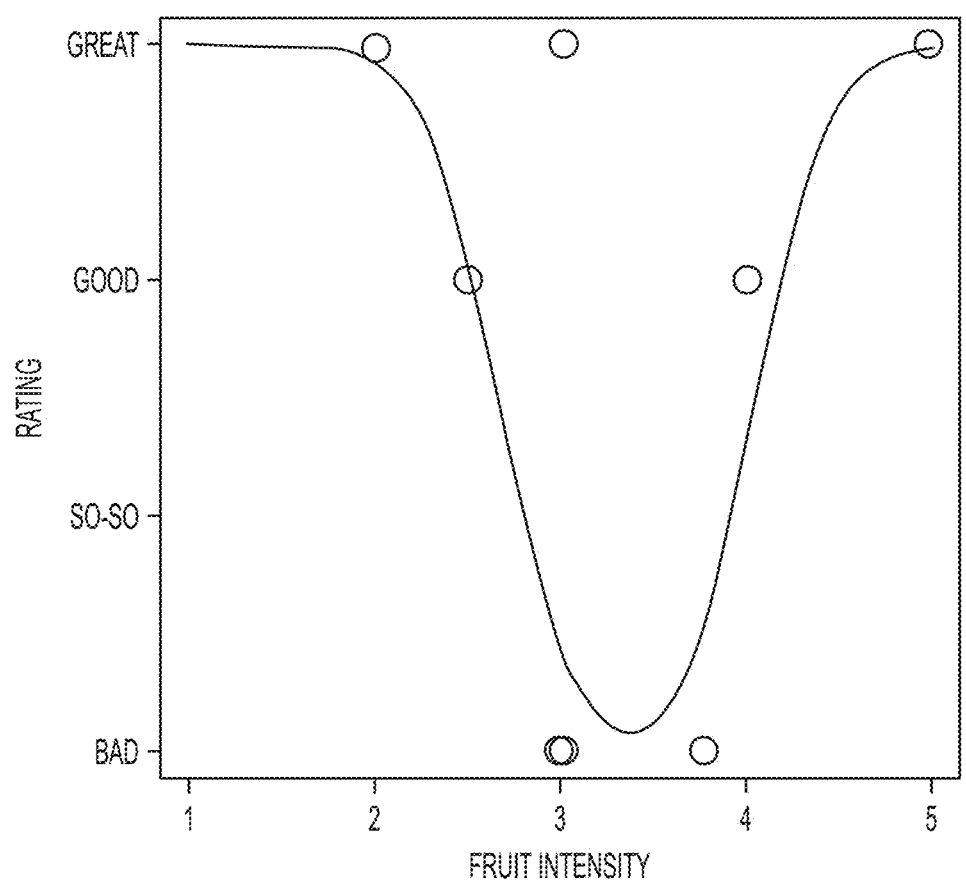
FIG. 8 is a graphic illustration of a second type of contrasting preference.
Figure 10:
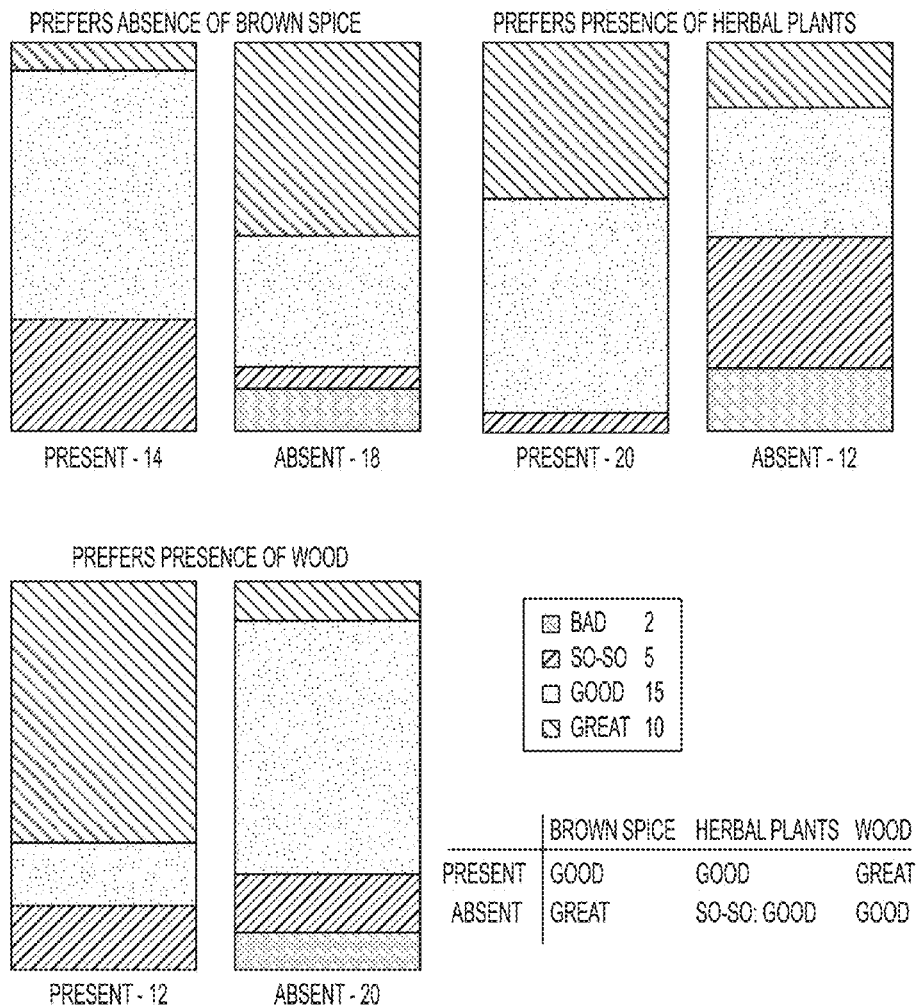
FIG. 10 illustrates associations between preferences and product traits in an example user profile.

In other embodiments, identifying a pattern of dependency may include identifying one or more focal contrasting preferences for the user. Identifying a focal contrasting preference may include: (i) identifying an item characteristic or quantitative or ordinal piece of rating context data associated with a group of rated items for which the rating set includes both relatively maximal ratings and minimal ratings; (ii) determining that the person's ratings for the group of rated items includes a focal zone of maximal or minimal ratings representing positive or negative appeal over a circumscribed span of item characteristic or context data values. An example of this is shown in FIG. 8, which shows how a particular person's ratings for wines varied based on the wines' fruit intensity. Here, the person enjoyed wines having either a high or a low fruit intensity, but did not enjoy wines that were in the middle of the spectrum. Thus, the focal point in the middle of the spectrum indicates that the user expresses a negative preference to wines of only moderate fruit intensity, or a preference for wines with either high or low (but not moderate) fruit intensity. Identifying a focal contrasting preference may also include (i) identifying one or more item characteristics and/or context data associated with a group of rated items for which the rating set includes maximal and minimal ratings; (ii) determining that the ratings for the group of rated items include a focal zone of maximal or minimal values for a convex hull of values in the Cartesian product of the item characteristic and/or context data values. An example of this is shown in FIG. 10 where a closed, central region of values for the Cartesian product of the Trait 1 and Trait 2 values encompass of zone of maximal ratings.

In some embodiments, determining a pattern of dependency may include identifying one or more consistent preference patterns for the person. Identifying a consistent preference pattern may include: (i) determining the set of item trait, attribute, and/or rating context data values that were used by the partitioning process to identify the subset of items being considered; (ii) measuring a representative rating for the subset of items created by the partitioning process; (iii) measuring the extent to which the item ratings are dispersed around the representative rating, i.e. the rating homogeneity; (iv) determining whether the rating homogeneity meets the criterion established for finding a consistent pattern of preference.

In some embodiments, determining a pattern of dependency may include identifying one or more polarizing preference patterns for the person. A polarizing preference model indicates that the person clearly exhibits a pattern of rating dependence, e.g. contrasting or consistent, for some trait values to one side of a threshold value, but the person's feelings about other values for the trait are either unclear, as the user may have given both high and low ratings to items exhibiting that trait at values outside of the threshold value, or show a different pattern of dependence. An example is a person who consistently likes highly acidic wines, but who has an inconsistent range of opinions about low acidity wines.

Analysis Methods.

A goal of the analysis methods described in this document is to determine whether a given subset of items fits any of the previously defined patterns of dependencies between ratings and item characteristics and/or rating context data. In addition, results of the analysis methods may also provide predictions of the ratings as a function of item characteristics and/or context data and the verified pattern of dependence. Further, the analysis methods may also provide an estimate of the consequentiality of the item characteristic and/or context data values supporting the pattern of dependency. This is done by calculating the cumulative joint empirical probability of those data over the extremes of their values. The analysis methods may provide other information that may be of use to the preference profile assembly process. Therefore, the following will describe implementations that use widely understood analysis methods in order to portray how an embodiment may operate.

Every item subset created by the partitioning process undergoes all of the forms of analysis described in the following. These methods seek to discover how well the item ratings fit the previously defined patterns of dependence. Some of these methods examine the dependence between the item rating and selected item characteristics and/or context data. This dependence may be sought as a function of just one or two elements of item and/or context data, although in principle more than two elements of data may be examined. One reason for seeking rating dependence as a function of fewer than three elements of data is to preserve the usefulness of the human readable preference description since incorporating too many drivers of preference in it may be confusing. Which of the item characteristics and/or context data to consider as a driver of rating dependence will depend upon the nature of the items, how preferences for them are determined and decisions about how to implement the system. Some choices may be driven by the nature of the data, e.g. colinearity. In wine for example, one probably would not use the Body and Alcohol intensity traits when seeking rating dependence because these traits may track each other. One may expect to exclude the item characteristics and/or context data that were used to determine the subset of items under analysis and the selection of which of the rated items for which a profile is to be generated. This exclusion is due to the fact that such data may have constant values.

Contrasting Patterns of Dependence.

Referring again to FIGS. 7 and 8, contrasting preference may be diagnosed here by 1) detecting a non-reversing upward or downward trend in ratings as a function of one or more item characteristics and/or rating context data (trending case) or 2) detecting a peaking or dipping trend in these variables (focal case). This may be done using a form of cumulative link model regression called ordered logit regression. (Other forms of this approach, such as proportional hazards or ordered probit, could be more appropriate for other types of items.) The ordered logit model handles situations in which the response variable has an ordinal data type, e.g. an item rating. The model predictors can have quantitative, ordinal or categorical data types or a mixture of them. This regression method can therefore be more suitable for our application than linear regression because the latter presupposes a linear relationship between the levels of the response variable. Since the response variable is a rating, it cannot be assumed that its levels are linearly related, e.g. that the distance between the middle rating and the highest rating is the same as that between it and the lowest rating. This regression can also be more suitable for analyzing categorical data types than using measures of association such as Pearson's chi-squared or Fisher's Test because these do not take into account the ordered nature of the ratings.

The following will illustrate a few examples of how the ordered logit regression can be used to detect signs of contrasting preference. The upper two plots of FIG. 7 give a graphical view of how wine ratings for an archetypical "acid freak" depend on the acidity and fruit intensity of the red wines tasted. The plotted circles show how the wine ratings (plotted vertically) varied as a function of the values of the wine trait (plotted horizontally). A little random jitter was added to the wine trait values so that the circles would not plot over each other. Overall the ratings increased with increasing acidity and decreased with increasing fruit intensity. The regression analysis sought to interpret these data as evidence for an upward or downward trend and plotted the predicted trend as a solid line running through and around the data points. The goodness of fit measures for both of these analyses were within the acceptable range with acidity being fit better than fruit intensity by two-thirds. Two trending preference models, parametrized by the regression procedure, were therefore produced indicating an increasing contrasting preference for acidity and a decreasing contrasting preference for fruitiness. This stage of analysis also looks for a pattern of preference as a function of combinations of item information. When the acidity and fruit intensity values were linearly combined, the regression fit a trending rating dependence pattern twice as well as when acidity was analyzed alone. The bottom left plot shows symbols representing ratings plotted at positions representing the values of the fruit intensity (vertical axis) and acidity (horizontal axis). The parallel diagonal lines are contours at each rating level that divide up this plot into regions that indicate the regression's prediction of how the user maps combinations of acidity and fruit intensity into ratings. It shows that the ratings increase in the upper-left to lower-right direction, indicating that the user prefers higher acidity while simultaneously lower fruit intensity. The lower right plot shows a narrower, but more easily interpreted view of the regression results. Here the ratings are plotted versus a linear combination of the acidity and the fruit intensity. The solid line shows the rating prediction made by the regression as a function of this combination of wine traits and it is a much tighter fit to the data than the single trait model.

FIG. 7 portrays an instance of preferences that can be described with different degrees of specificity. A compact, less specific, way of describing the driver of this person's preference is that he or she prefers high acidity to low acidity. The preference running against fruit intensity is less accurately defined and so could be a secondary finding. A more accurate but less compact, more specific, description of preference includes the additional effect of fruit intensity. If desired, both assessments may be made available to the user, and this presentation may include displaying the assessments in order of prominence. Since acid intensity and fruit intensity strongly and negatively co-vary in the sample of wines tasted, it is natural to assume that the preference against fruitiness is driven by the stronger preference for acidity. However, since there is a stronger preference model fit from the combination of fruit intensity and acid intensity, it suggests that the fruit intensity is an independent driver of preference and carries additional information.

A goal of looking for a trending contrasting pattern of dependence may be to be able to say that a person's taste runs along with the degree of expression and/or presence of particular things about the item itself and/or the circumstances of the consumer's perception of that item. Informally described, a trending contrasting pattern of dependence is a case where the ratings trend with the monotonic, i.e. single direction, expression of an item characteristic and/or piece of context data. Examples applicable to wine are that the consumer likes more over less tannin, or likes the presence of woody flavors and dislikes the absence of those flavors. There can be a case where ratings show a statistically detectable increase in preference with increasing tannin intensity, where tannin intensity is a type of item information that has an ordered data type. It can also be a case where ratings for wines having a woody flavor are statistically higher than the ratings of those wines that don't, where woody flavor is a type of item information that has a categorical data type. It can also be the case where ratings change as a function of both tannin intensity and the presence of a woody flavor, thus depending multiple types of data.

More formally described, a trending contrasting pattern of dependence is manifested by a verifiable association between the item ratings and the monotonic progression of the values of item characteristics and/or context data, whether there are single or multiple types of information having ordered or categorical data types, or a mixture of both. Such verification may be made by means of statistical analysis. This pattern of dependence may be discovered by finding that the p-value of a statistical analysis falls below a given threshold value. The p-value is the probability that the pattern of dependence arose by chance. Therefore our confidence in the discovery of a pattern of dependence goes up as the p-value goes down. Optionally, the system may use a 0.1 p-value threshold so that there is a 90% chance that the discovered pattern of dependence is not spurious.

The portrayal of analyses based on item characteristics having ordinal data types is very much the same as the above examples using quantitative data types and so a separate illustration is not provided. The portrayal of categorical item characteristics, while also conducted using ordered logit regression, differs in character from that using quantitative or ordinal data. For example FIG. 10 uses bar plots to show the associations between ratings and the categorical wine traits depicting three types of wine flavor, "Brown Spice", "Herbal Plants" and "Wood," for a person who rated 32 red wines. The effect of each type of flavor was analyzed separately. The presence and absence of a flavor was coded as a 1 and 0 respectively and this information, along with the corresponding ratings, was entered into the regression. The regression showed whether there was a statistically significant upward or downward shift in the ratings as a function of the flavor and also indicated the direction of dependence. In FIG. 8, three sets of a pair of stacked bar charts show the proportion of the wines receiving each rating for the cases in which a flavor trait was present and for the cases in which it was absent (the underlying labels show the number of wines for each case). The sizes and shadings of the various sub-portions of the bar charts portray the relative proportions of the ratings in each instance. Overall, this person thought that 25 of the 32 wines were good or great (see tally in the legend box) and so there is only a small margin for detecting preferences. Nevertheless it's possible to notice shifts in ratings in the plots according to the presence of flavors and the regressions reported highly statistically significant associations between the presence or absence of these flavors and an upward or downward shift in ratings.

In FIG. 10, the title above each pair of bar charts shows the preference conclusions drawn from these analyses. When Brown Spice was absent there was an upward shift in the overall pattern of ratings. The table in the lower right corner of FIG. 10 shows that the predominant rating went up from Good to Great when this flavor was absent. When Herbal Plant flavor was present the predominant rating went from somewhere between So-So and Good up to Good. Likewise, when Wood flavor was present the ratings shifted from predominantly Good to Great. Interestingly, the effect of each flavor on the ratings was independent of the other flavors. This is because when the regression was performed on pairs of flavors, or on all three flavors at once, each flavor retained a statistically significant ability to shift the pattern of ratings. At the margin, this person prefers wines with Wood and Herbal Plant flavors and without Brown Spice flavors, both individually and together in various combinations. This driver of preference, however, exerts an important effect, shifting the ratings on the order of magnitude of a single step.

In instances where a categorical variable is able to take on more than two values, e.g. left/middle/right, a trending form of contrasting preference may be identified. A non-reversing progression in the ratings that is a function of a specific ordering of the categorical values indicates a contrasting preference. In practice this form of dependence may be detected by an ordered logit regression on the categorical values wherein the estimated coefficients for these trait values are statistically distinct from each other.

An example of a focal variety of a contrasting preference model, fit for a person tasting white wine, is shown by FIG. 8. Ordered logit regressions look for non-reversing trends, so in order to fit the focal variety, the data was transformed by assuming a center value for the fruit intensity. Initially the median was chosen. Then the absolute distances of the fruit values from that center point was fed into the ordered logit regression. As a result, the regression saw trait values that increased from the center point and thus a peaking pattern would appear as an increasing trend. Conversely, a dipping pattern would appear as a decreasing trend. Since the initial guess at the center may not be the best choice, this center value was also optimized along with the other parameters of the regression. The best fit circles indicate where the ratings fell (vertical axis) as a function of the wine fruitiness (horizontal axis). The regression analysis found evidence for a downward dipping pattern of preference and the corresponding predictions of ratings as a function of fruit intensity for such a model are traced by the solid line. It passes through nearly all but one of the eight plotted points. Because of that one outlying data point this fit is almost at the outer limit of acceptability. This quality of fit will be taken into account, such as in later procedures responsible for prose generation. Such a preference model indicates that mid-range levels of fruit intensity are preferred much less than lower or higher ones. It was earlier shown that a trending preference could be found for the linear combination of two wine traits. The same can be done in searching for focal contrasting preference models. In such a case the linear combination of trait values would be formed before their distances from a center point are calculated. Fitting such a model would indicate that there is a combination of trait values that is preferred or not preferred, somewhere away from the largest and smallest values for that trait combination.

Figure 11:
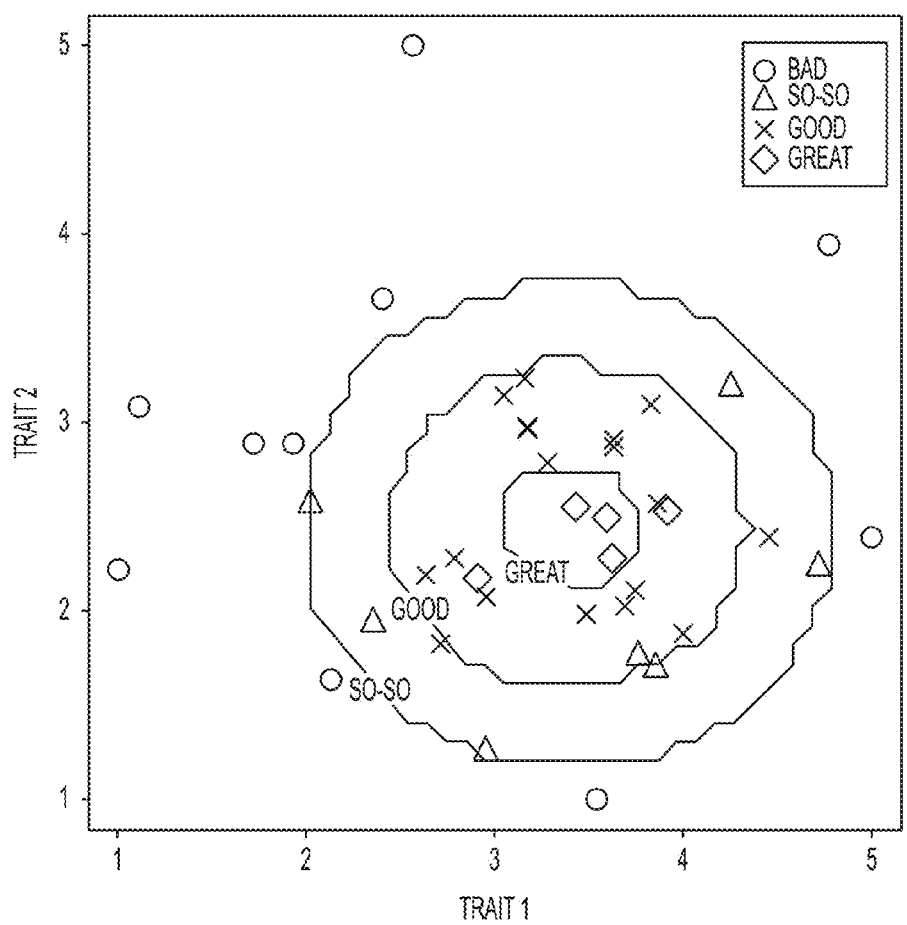
FIG. 11 shows an example of data indicating contrasting preference for a user.

There is another case of a focal variety of contrasting preference involving two wine traits that is different from the last illustration. FIG. 11 demonstrates this example. In this case ratings, represented by four different symbols, are plotted at the horizontal and vertical positions given by the each of the two sets of trait values. The highest ratings are clustered at the center of the plot area, the lowest ratings appear around its periphery and intermediate rating values concentrically fill in the intervening regions. The regression predicted ratings at all points in the plot area in a way that best fit the set of data. The roughly circular contours enclose the regions predicted to have each rating value. Given the good quality of fit found here, such a data set would be taken as evidence for a contrasting preference model of the "bullseye" variety. In this case of wine, it indicates that there is a preference "sweet spot" for wine traits having a range of values that put it within the innermost contour of high ratings.

One may look for a focal contrasting pattern of dependence in order to be able to say that a person's preferences are driven along the distance from a circumscribed range in the degree of expression of particular item characteristics and/or its rating context. Informally described, a focal contrasting pattern of dependence may be a case where the ratings monotonically trend with distance from a circumscribed range in the values portraying the expression of an item characteristics. As an example, this can be a case where ratings show a verifiable progression in values with increasing distance from a circumscribed range of tannin intensity values. Such verification may be made by means of statistical analysis. Formally described, a focal contrasting pattern of dependence may be manifested by a statistically detectable association between item ratings and a monotonic progression in the values of single or multiple item characteristics and/or context data having ordered data types away from a circumscribed range of values. This pattern of dependence may be discovered by finding that the p-value of the analysis falls below a given threshold value. The p-value is the probability that the pattern of dependence arose by chance. Therefore our confidence in the discovery of a pattern of dependence goes up as the p-value goes down. Optionally, we may use a 0.1 p-value threshold so that there is a 90% chance that the discovered pattern of dependence is not spurious.

Consistent Patterns of Dependence.

A goal of looking for a consistent pattern of dependence is to be able to identify cases where a given combination of item characteristics and/or rating context data used to form the subset of items under analysis elicit a consistent response from the user. An example of this pattern of preference include one where a user usually dislikes wines having a barnyard aroma. Informally described, a consistent pattern of dependence is a case where the user's ratings for a subset of items tend to cluster around a single value. In such cases, the item characteristic and/or context data values used in the partitioning process to form the item subset characterize the preference. For example, when looking at a subset of selected white wines consisting of only those tasted during the winter months, finding that this partitioning yielded consistently mediocre ratings, would characterize a consistent pattern of dependence. In other words, the user is apparently not crazy about white wines during the winter. More formally described, a consistent pattern of dependence may be manifested by finding that ratings evidence a degree of statistical dispersion, e.g. standard deviation or mean absolute deviation, sufficiently low so as to be taken as effectively constant. This pattern of dependence may be discovered by finding that the measure of statistical dispersion of ratings falls below a given threshold value. The smaller the degree of statistical dispersion, then the greater confidence that the ratings are effectively constant.

Polarizing Patterns of Dependence.

One may look for a polarizing pattern of dependence in order to be able to identify cases where a combination of item characteristics and/or rating context results in one type of rating dependence being found but situations outside of that combination results in a different type of rating dependence being found or no pattern of rating dependence being found. Of specific interest are instances of polarizing dependence that are manifested by finding a consistent pattern of rating dependence in conjunction with no defined pattern of rating dependence. An example of this is demonstrated where the user usually dislikes sweet wines but has a range of opinions, i.e. an undefined pattern of rating dependence, for non-sweet wines. Finding such a polarizing pattern of dependence entails describing the boundaries within which appeal is defined. Informally described, such a polarizing pattern of dependence may occupy the ground between a contrasting pattern of dependence and a consistent pattern of dependence. As with a contrasting pattern of dependence, the system may consider a range of ratings within the subset of items. However, the relationship is not defined over the entire range of values taken on by the set of item information defining that pattern of dependence. However, like the consistent pattern of dependence, the ratings are defined and effectively constant. However this constancy only exists within a certain range of values taken on by the set of item characteristics defining that pattern of dependence and not across the entire subset of wines. More formally described: (i) for item characteristics and/or context data having quantitative or ordinal data types, such a polarizing pattern of dependence may be found when a threshold can be found for the data values defining the relation; and (ii) for item characteristics and/or context data having categorical data types a polarizing pattern of dependence is found when a trigger value can be found for the data defining the relation. In the case of quantitative or ordinal data, the ratings of wines having characteristics values to one side of the threshold are effectively constant and the ratings of the remaining wines are not constant. In the case of categorical data, the ratings of wines having characteristic values equal to that of the trigger value are effectively constant and the ratings of the remaining wines are not constant. In cases where the item characteristics and/or context data have mixed data types the threshold and trigger conditions are separately applied to each item characteristic and/or context datum and the wines that satisfy both of them may be seen to have effectively constant ratings while the remaining ones do not. Determining when ratings are effectively constant is done by finding a sufficiently low degree of statistical dispersion as, for instance, may be done to identify a consistent pattern of dependence. This pattern of dependence may be discovered by finding the measure of statistical dispersion of the ratings for wines satisfying the threshold and/or trigger criteria falling below a given threshold value and that the statistical dispersion of the ratings for the remaining wines lie above another given threshold value. The smaller the degree of statistical dispersion in the former, then the greater the confidence that the ratings are effectively constant. The larger the degree of statistical dispersion in the latter the greater the confidence that the ratings are undefined.

The preceding describes the primary form of polarizing preference sought out by this analysis. In full generality, the polarizing pattern of dependence can be described as a circumstance where there is a certain value(s) for an item characteristic(s) and/or context data that serves to divide the subset of wines into two parts: a part where one specific pattern of dependence is recognized and a part where another or no recognizable pattern of dependence is found. The example described above embodies the case of a consistent pattern of preference paired with no pattern of preference. Other possibilities include a contrasting pattern of preference paired with no pattern of preference and a consistent pattern of preference paired with a contrasting pattern of preference.

Example of Analysis Based on Class Data Types

While rating dependency patterns may be sought as a function of any arbitrary collection of classes, particularly useful results may be obtained when such classes are restricted to having defined hierarchical relationships. The class hierarchy used may be all, or a subset, of one constructed for all items or a selection of items, e.g. the hierarchy constructed on a portion of the red wine style base classes shown in FIG. 9. A pre-specified hierarchy may be used and/or one contingently constructed at the time of analysis on the basis of item characteristics and/or user context data. One may analyze the rating dependence patterns of items assigned to a given class and consider only that class and the ancestors to that class as potential data against which rating dependence is sought. That is, take as drivers of the rating dependence patterns either: (i) the class under consideration as a whole; or (ii) the items directly assigned to the class and the items that are also members of the lower level classes that combine the form that class. As was done with quantitative and ordinal traits, contrasting preference across classes may be assessed by ordered logit regression. Similarly, as in its application to the analysis of other types of categorical data, the regression here may weight the data by the similarity of the items to the class under analysis. A regression is performed on subsets of the class members according to each of the multiple ways they can constitute the class under consideration.

In one embodiment, e.g. where higher level classes are formed by the pairwise merger of lower level classes, four analyses may be performed: all three class components are compared against each other at once, the two immediate sub-classes are compared to each other, and the subset of directly assigned items is separately compared against each of the immediate sub-classes of items. The sign and value of the parameters returned by the regression may be interpreted to determine the direction and relative strength of preference. The statistical significance of the regression may be determined by likelihood ratio test statistics. A contrasting preference may be diagnosed if there is sufficient statistical significance. Consistent preference may be assessed using all items comprising the subject class. This determination may be made by measuring homogeneity in the ratings, such as can be derived from the class similarity measures and the ratings. This measure indicates how closely the ratings tend to cluster around a predominant value and how closely similar the rated items are to the class. A sufficiently high homogeneity in ratings indicates that the class members are effectively equally preferred and thus well identified with the class. A threshold value is used to denote homogeneity sufficiently high to indicate consistent preference for the class. The homogeneity measure may be any suitable measure.

A polarizing preference of the consistent/no pattern form may be assessed in three combinations of the subsets of items that may comprise the class: the subset of items directly assigned to the class versus each of the two immediate sub-classes of the subject class and these two sub-classes against each other. One way to detect the primary form of polarizing preference is to compare the ratings homogeneity of each subset of items. A polarizing preference is identified when one of these subsets has homogeneous ratings and the other does not. The latter determination is made when the homogeneity of the former meets or exceeds a threshold, and the homogeneity of the latter is equal to or less than a lower threshold. Other methods have been used to make this determination but their description was deferred in favor of this simpler technique.

Figure 12:
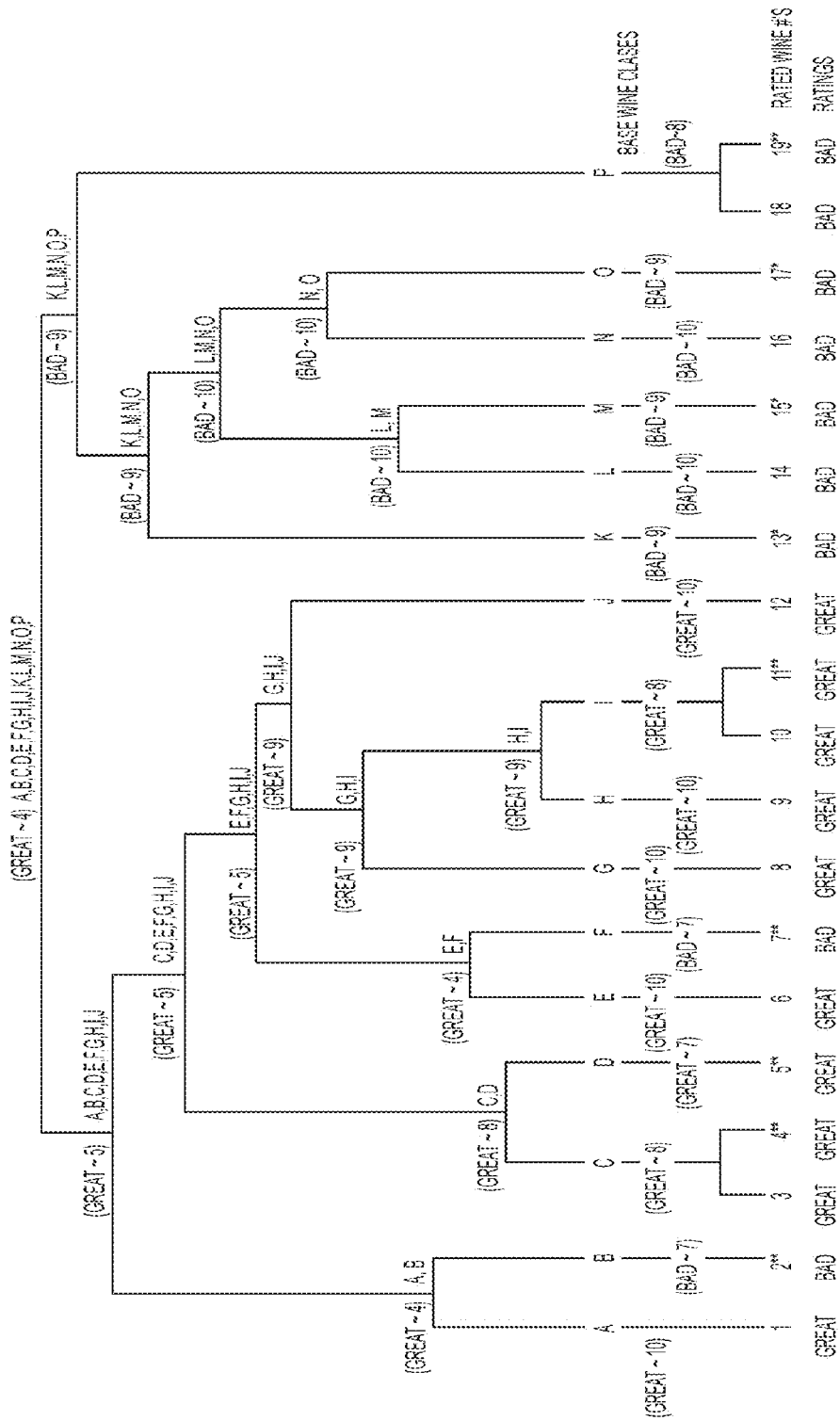
FIG. 12 is a dendogram illustrating a user's preference for various classes of items.

An example of analysis according to class descriptors is portrayed by FIG. 12 where the hierarchy corresponding to the classes associated with the rated wines is depicted along with other information. In order to simplify this presentation the class assignments of rated wines 2, 4, 5, 7, 15 and 19 were altered. Normally they would be assigned to classes at higher levels of the hierarchy but they were instead assigned to the base classes to which they were the most similar and their similarity values were adjusted accordingly. If this were not done then the diagram would show these wines and their ratings attached to various levels of the hierarchy. In this sample data set, the wines and ratings typify a person who loves plush, fruit forward, new world red wines but hates astringency. Nineteen wines were rated and their numbers and ratings run along the bottom margin of the diagram. The base classes to which these wines were assigned run in a row above them and are identified by the letters A through P. Vertical lines indicate the assignment of rated wines to their classes and their similarity to them depicted by asterisk superscripts—no asterisk reflects a similarity value that equates to "most similar", one asterisk reflects a similarity value that equates to "pretty similar" and two asterisks reflects a similarity value that equates to "somewhat similar." The composition of the higher level classes is depicted at each hierarchy level by listing the letters for each contained base class. These letters also serve as the class trait name. Thus the top of the diagram shows all of the letters together in one class and the bottom of the diagram shows single letters with each base class.

In addition to the class composition, each hierarchy level in FIG. 12 shows in parentheses the class rating and rating homogeneity. For clarity the homogeneity value was multiplied by ten and rounded to a single digit, e.g. a homogeneity of 1.0 corresponds to 10 in the diagram. Finally, the ratings and homogeneities of the base classes are shown vertically oriented, parenthetical labels below them. To compensate for changing the class assignments, the class similarity levels at the base class level were carried through to all of the rating homogeneity calculations instead of using the similarity values appropriate to each level.

Analysis begins at the top level of FIG. 12, where a strong contrasting preference is found to favor the left class subset (A, B, . . . , J) over the right class subset (K, L, . . . , P). The left branch of the hierarchy is rated as Great, albeit with not much rating homogeneity, and the right branch is rated Bad with a high rating homogeneity. A description of the right class subset would reflect that the subset comprises nearly entirely Old World wines, modest in fruit and that the astringent wines of the world are concentrated within it. A description of the left class subset would reflect that the subset comprises primarily New World wines, bountiful in fruit and largely lacking an astringent character. Prose generated on the basis of these descriptions would match the stated preferences actually underlying this data set. This prose would more accurately describe what is not preferred than what is preferred since the rating homogeneity of the left branch class is lower than that of the right branch class. The rating homogeneity values (5 and 9) for these two subsets fails to satisfy the conditions for finding a polarizing preference, but if it did, its diagnosis would be preempted by the higher salience of the contrasting preference found for the same subsets. Because the rating homogeneity is below 7 it is also clear that there is no consistent preference for the class representing the combination of these classes.

The classes comprising the right branch of this hierarchy all show strong evidence of consistent preferences against their classes. The situation is mixed for the classes comprising the left branch of the hierarchy. The six classes that contained wines 2 or 7 generally had middle to low values of rating homogeneity. That prevented finding consistent preferences in those classes, although in two of them there were trivial cases of contrasting preference involving only two wines. The four classes that didn't contain wines 2 and 7 showed consistent preferences because of their high ratings homogeneity.

Assembly of Preference Models.

Preference models may be assembled from each of the patterns of preference, i.e. patterns of rating dependence, discovered during the analysis of the subsets of selected items. In some embodiments, the assembly of preference model may include any or all of the following steps: (i) identify a pattern of dependence that was discovered; (ii) identify the types of item information defining the pattern of dependence; (iii) capture how the analysis method characterized the pattern of dependence (e.g., p-value, rating dispersion, etc.); (iv) identify the values and types of item characteristics and rating context data that were used to define the subset of selected wines that were analyzed; and (v) identify the values and types of item characteristics and/or context data that were used to select from all of the items that were rated by the user to create the preference profile.

Other types of information about the pattern of dependence that may be needed by subsequent stages of processing can be added to this collection.

Assembly of Preference Profiles from Preference Models.

The stage comprising the discovery of preference models can return of a variety of results. The preference models will have a variety of rating dependence patterns that are discovered with varied degrees of model fit, explainability and consequentiality. These preference models will also vary as to the number of simultaneously analyzed types of item information and will encompass subsets containing a variety of different selected wines. Only those models whose fitness metrics indicate that a preference pattern has been identified with sufficient certainty are used for preference profiles.

It may be desired to generate multiple preference profiles for a consumer having a range in the generality with which the consumer describes drivers of preferences. For example, a person may find it more useful to have a short, simple, low specificity explanation of his drivers of preferences, even if the short description does not have high collective coverage, informativeness, explainability and consequentiality, while also having low specificity and multiplicity. Such a preference profile can be created by constraining the assembly of preference models to be a subset of those items that cover all of the selected items. On the other hand, another person may desire a long, specific, complex explanation of their drivers of preferences, even if it has high collective multiplicity. Such a preference profile can be created by constraining the assembly of preference models to be a set of those that cover most or all of the selected items. It may be desirable to generate a series of preference profiles that cover the range of preference descriptions between these two extremes so that the user has the option to learn their preferences in as much detail as they desire.

For the purpose of the discussion of the previous paragraph, coverage is a measure of the fraction of the selected items that appear in at least one of the partitions of the assembled preference models. Uniqueness is a measure of the fraction of the selected items that appear in no more than one of the partitions of the assembled preference models. The informativeness of a preference model proceeds from most to least with the following ordering of their underlying pattern of dependence: trending contrasting, focal contrasting, consistent and polarizing. Multiplicity is the total number of preference models comprising the preference profile. Consequentiality applies to item characteristics and context data and describes cumulative empirical probability of encountering the range of values associated with the subset of items associated with the preference model in the user's world. If that probability is high then the model is highly consequential.

Changing Preference Profiles with the Addition of New Ratings

Several approaches may be taken with respect to changing a user's preference profile as the user adds item ratings to the database. One approach is to generate the user's profile anew after the user updates their rating history with one or more item ratings. Another approach is to delay generating the user's profile anew until some criteria is met, e.g. when a minimum number of items rated. A third approach is to adopt the less computationally intensive method of updating only the profile models without partitioning the rated items and discovering preference models anew. The first part of this third approach, called updating, requires identifying the preference models associated with the newly rated items. That is, going through the item characteristics and rating context values used to create the subsets of items associated with the preference models and determining whether the item characteristics and context data for the newly rated item qualifies it for inclusion in the subset. The identified preference models are updated by analyzing the data set comprised of the previous items and the newly rated item. The updated results and performance metrics are passed along to the affected preference profiles and the human readable portrayal of the profiles are updated with the new results. Limits may be imposed on the use of the updating method. For instance, as in the second approach, a profile update may be overridden and a profile generated anew if certain criteria are met, e.g. a given number of newly rated wines since the last profile generation. Another reason to generate a profile anew is if the performance metrics of the updated models sufficiently degrade since this is a possible sign that the items need to be partitioned anew.

Improving Preference Profiles and/or Individual Preference Models by Suggesting Additional Items to Rate The process of suggestion generation may be illustrated using a preference model characterized by a consistent preference rating dependency pattern. This pattern describes a state wherein items were assigned a narrow range of ratings by the user. Among the metrics and flags that the system may consider include a measure of the effective number of items supporting the finding (experience score), a measure of the spread of the item ratings around the model prediction (model fit) a measure of the sureness with which the items identify with the item description (subset similarity) and a flag (outlier indicator indicating) which of the items can be considered to have an outlying rating. In order for a preference model construction, the system may require sufficient experience score, model fit and subset similarity. This last proviso can apply to item subsets created on the basis of item being members of specific classes wherein the assignment of an item to a class is accompanied by a strength of association measure, i.e. the identification of the item to the class. Preference profiles also may require the identification of items whose ratings make them outliers with respect to the preference model.

Each of the above metrics and flags can be used as a basis on which to generate item suggestions. For example, in the context of an experience score, the system may determine a user's experience score as a function of the number of rated items in the preference model. This may be a raw number equal to the number of rated items, a percentage of a target number of rated items, or some other function. If the experience score for the items in the subset associated with the preference model is below a threshold, then the system may determine that strength of this model can be bolstered if the user is directed to experience and rate more items that fit the item description associated with the preference model. The system may then access the database of candidate items and identify an item that, if rated, would improve the user's experience score for that preference model. It may then suggest that the use experience and rate that item. This will increase the number of effective items associated with the preference model if there is a below threshold or marginal value in the subset similarity of the rated items with the item subset description.

By having the user experience and rate items that match the item description used to construct the item subset, the system can expect to increase the similarity of the items to the definition of the subset for that preference model. If it is assumed that a user will rate similarly identified items in a similar way, then we can expect to improve the model fit by suggesting items fitting the item subset description. In this instance, a more sophisticated approach is possible wherein a deeper pattern of rating dependence can be sought, and the results used, to create a more targeted item description from which to suggest items to try. Similarly, when outlying item ratings are flagged, it is possible to determine whether such ratings are flukes by creating item descriptions more closely identified with the flagged items than the item description used by the model. The ratings for items suggested on the basis of such a narrower item description may or may not be consistent with the outlying rating and so indicate whether chance or other reason was the cause of the outlying rating or an insufficiently specific preference model.

The following describes other ways in which the preference profile can be improved by suggesting additional items to rate. A contrasting pattern of rating dependence is characterized by specific forms of rating trends as a function of item characteristics or by a contingent difference in ratings as a function of categorical item characteristics. The methods used to detect a contrasting pattern of rating dependence may include any of a variety of regression, contingency and statistical testing techniques. Therefore, their metrics may include, among others, measures of association, leverage and hypothesis exclusion probabilities. For example, if a preference model of the contrasting type indicates that a range of item information values exerts high leverage in a regression analysis, then an item description can be generated that corresponds to the regime of item characteristic values for which rating data are lacking Obtaining the ratings for suggested items that satisfy such a description may reduce leverage in the regression analysis and so increase the accuracy of its findings. Also, if a contingency test reveals that cells associated with certain item information values are underpopulated relative to other cells, then suggestions can be generated on the basis of item descriptions pertaining specifically to such cells. Having the ratings for such items will increase the statistical confidence in the conclusions reached by a contingency test and so bolster the preference model. Suggestions can be used to deal with a case where there is no support for a univariate dependence of ratings on item information but for which the range in values for other variates is too small to support a multivariate analysis. Suggestions can be generated on the basis of a description of items possessing a wider range of values than possessed by the variates that currently span too small of a range of values.

As the preceding illustrates, the methods used for suggestion generation may depend on the preference model and its performance metrics. The suggestion generator may be triggered by preference descriptions whose performance metrics are indicative of sub-par or marginally acceptable values. The specific details of such methods may depend upon identifying the means by which item ratings and item information interact to give rise to "better" or "worse" values of the performance metrics and working backwards to determine the values of item information that are required in order to hope to see those metrics improved. This process may depend upon the particular implementation of the recommendation system.

Group Profiling

The discussion above describes preference profiles that include preference models which may be based on at least three different types of rating dependency patterns: (1) contrasting preference, (2) consistent preference and (3) polarizing preference. The system may identify a group of users whose profile data indicates that they are members of a group, and it may use the preference models that are associated with the individual group members to develop a group profile for that group based on a "consistent preference" ratings dependency pattern.

This ratings dependency pattern describes a state wherein items satisfying a given description are assigned a narrow range of ratings by the user, i.e. the degree of appeal. Degrees of appeal may range from the most unappealing to the most appealing, or from a lower threshold to an upper threshold. Degrees of appeal can be represented categorically, e.g. Dislike, So-So, Like and Love, or by a number on a given scale, e.g. from 1.0 to 4.0, or by other representations.

The item description may be given in terms of item traits. For example, in the case of wine, the fruit intensity, presence of spice flavor, membership in an item class all may be suitable item descriptions. Item descriptions also may be given in terms of item attributes—the fixed properties of the item—such as, in the case of wine, grape composition, region of cultivation, or percent alcohol by volume.

Another, optional element of the preference model is a level of confidence in the model, a value that can be represented numerically or categorically.

In each user's profile, the item description for rated items may be augmented by user-associated information, such as a context or circumstances of the item experience (e.g., on vacation, during the summer, with friends), as these circumstances can affect the appeal of the item. Such user-associated information can be associated with or part of the item descriptions in each user's profile data.

When a user establishes or joins a group, the user may be presented with a list of available groups, or the system may present the user with an interface through which the user may identify multiple users who will join the group. The user may be able to prioritize one or more users, such as by ranking them relative to each other or designating one or more as having priority over the others. The system will use such rankings or designations to weight the preferences of various users when creating a group profile, as described below.

Figure 13:
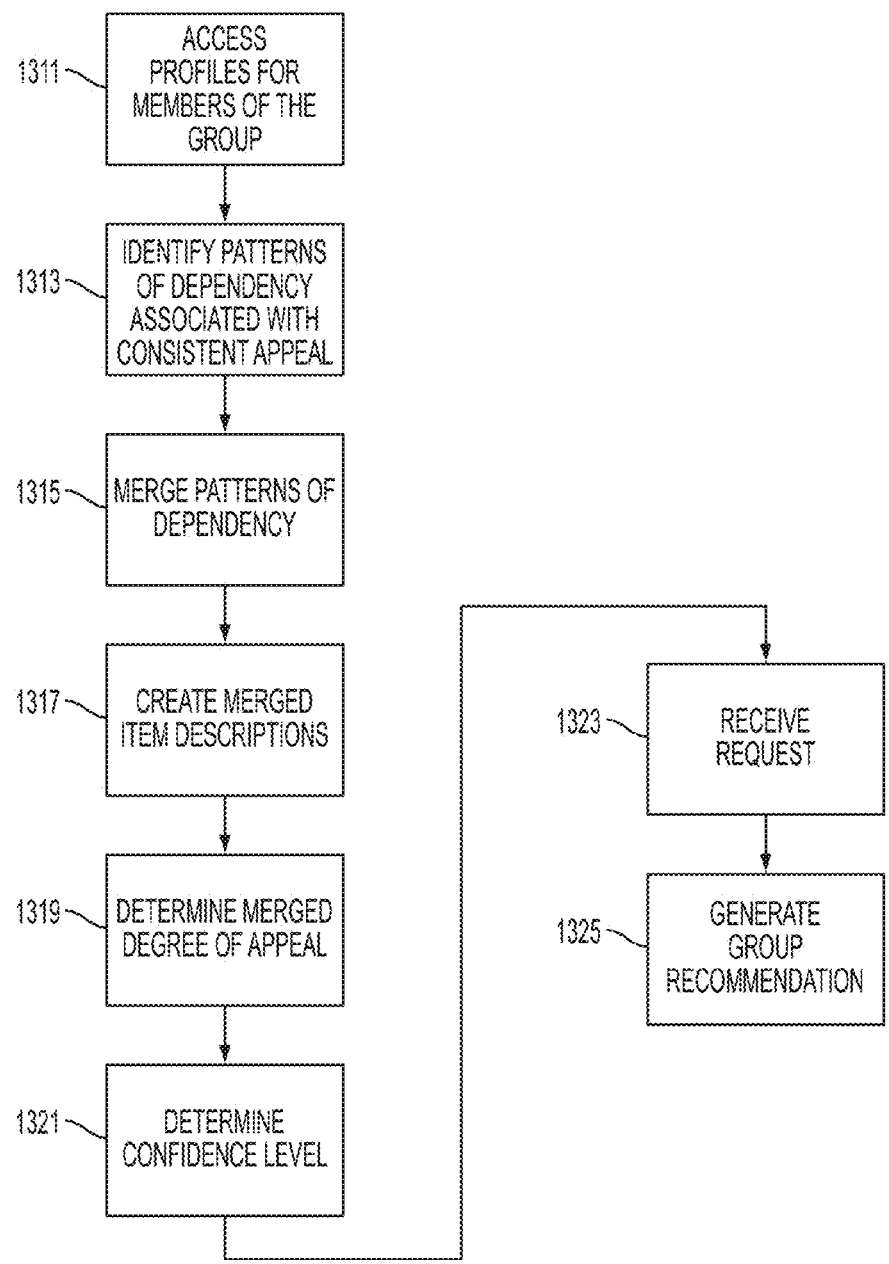
FIG. 13 is a block diagram of a method of generating a group preference profile and making group recommendations.

Thus, referring to FIG. 13, the system may access profiles 1311 for members of a group to identify consistent preference models. As described above, each preference model may include data representing a pattern of dependency between the model's associated user's ratings for a set of items and the characteristics of those rated items. In one embodiment, at least some of the consistent preference models are models that are each associated with positive appeal. That is, the system may identify consistent preference models among the users for which at least a threshold number or portion of the group members have assigned a positive degree of appeal 1313. A positive degree of appeal in a consistent preference model may be found if a specified rating or group of ratings to the items described by their consistent model, or at least a minimum rating. A minimum rating may be, for example, "Like," in which case all ratings of "Like" and "Love" may be considered evidence a positive degree of appeal In full generality, these preference models can include information about context, or the circumstances of the users' experience of the item (e.g., season, social setting, mood).

The first part of this description will use examples as if obtained from consistent appeal preference models discussed above with the proviso that this description is equally applicable to such models created on the basis of information generated by different systems. A description of how this may done is given later. Also, hereafter, a preference model referenced without qualification is understood to be of the consistent preference rating dependency pattern type.

To process a group recommendation, the system may create a merged preference model for the members of the group. This may be done by merging the consistent patterns of dependency for the user members 1315, creating merged item descriptions 1317 for each merged preference model, calculating a merged degree of appeal of each merged preference model 1319 and optionally a merged degree of confidence 1321 in the merged model. The item descriptions may be merged across the users in the group by including elements of mutual intersection. Item descriptions portray the item traits and/or attributes. They can be represented by numerical ranges, categorical indicators or text strings. In the case of wine, examples of simple item descriptions are: "Fruit Intensity: 3.5 to 5", "Fruit Type: Citrus AND Flavor: Mineral", "Class: Juicy-Jammy", "Setting: Social" or "Keywords: Cherry, Fun, Refreshing." Item descriptions may also be merged on the basis of user-associated information, or in some embodiments exclusively on such information.

To create merged item descriptions 1317, the system may determine which traits, attributes and user-associated information are to be used as a basis for merging preference models and of those, which types of representations. This choice may depend on the nature of the item recommended, the setting or the group or to attain a given level of performance.

When merging on the basis of traits, the group recommendation will be carried out on the sensory aspects of the items. Merging on the basis of attributes will give the group recommendation more of an objective basis. User-associated information can be used to lend a context dependence to the group recommendations. It is possible, given the nature of the recommendable items, that the system will recommend more or less appropriately given the type of information used for merging models. For example, when recommending wines, the item traits would seem to offer a better basis than the item attributes. Any and all combinations of these information types can be used as a basis for group recommendation.

The system may then receive a request for a recommendation 1323. The request may be a specific request submitted by a user, such as a member of the group. Or it may be an automated command to provide a group recommendation whenever a member of the group performs a certain action, such as accesses the application. The request may include one or more criteria, such as a desired class of items, desired traits, a context, or other information that the system may consider to be a required criterion for a recommended item when making a group recommendation 1325 for one of the items in the database. An example of a user interface showing this is found in FIG. 4, and an example of a user interface for defining a group is shown in FIG. 5.

Optionally, the system may create the merged group profile after receiving the definition of a group or the request for a recommendation. The request may include an identification of one or more group members, as well as one or more criteria for the items retrieved by the group recommendation to satisfy, such as item traits or attributes.

After selecting the basis for the group recommendation from among item traits, attributes and user-associated information, the system may select from among them on the basis of their representations, i.e. numeric, categoric indicators, text, etc. Each of these representations may require a different method for determining the intersection of item descriptions. Intersecting item descriptions given by numeric representations requires finding intersecting ranges of numerical values for all of the representations in the item description. For example, if two users both have preference models with item descriptors "Fruit Intensity: 3.5 to 5" and "Fruit Intensity: 1.5 to 4.5", then their intersection, "Fruit Intensity: 3.5 to 4.5" is used as a merged item descriptor. Here only, a single item descriptor was illustrated but in general the intersection operation may be carried out on all item description members. In the case of a categorical indicator such as Class, the intersection operation for two users having item descriptors "Class: Juicy-Jammy" and "Class: Red Wine" in their preference models would yield a merged item description of "Class: Juicy-Jammy" since this Class is a subset of the Red Wine Class. Likewise, a method for forming intersecting textual item descriptions would be used to create merged item descriptions. Depending on the nature of the items, it may be the case that it is more or less difficult to find intersections among the values of different types of item description representations. Given this possibility it will be useful to use those representations for which intersections are most readily found.

The selection procedures described above, i.e., based on the type of item description and item description representation, may not yield many intersections across more than one user if the item descriptions are specific in nature. For example, if a preference model depends on the traits and attributes, e.g., "Country: France AND Fruit Intensity: 3 to 5," or if the representations in the preference model are mixed, e.g., "Acid Intensity: 4 to 5 AND Fruit Type: Citrus", it is possible that only one user's preference model will fit that description.

Preference profile merger may be performed after the types of item information and user-associated information serving as the basis for preference profile merging have been selected as well as their representation types. The item descriptions of the preference models for each user in the group may be examined, and those whose item descriptions contain only those selected types of item information and selected types of representation are selected for further processing. The system may then go through the list of selected item descriptions and merge 1317 together item descriptions across users that feature the same or similar types of item information that are also represented in the same or a similar way. If in the merger process the intersection of the item information values yields the empty set then that item description may be discarded. Otherwise, for those users having item descriptions whose merger results in a non-empty intersection, even if contributed by a single user, then the system may note the degree of appeal for those item descriptions and record the merged item description.

In one embodiment, in a system where profiles include base classes and one or more derived classes as described above, the item trait giving the base class of the wine may be used for the intersection of item descriptions. Thus only those preference models that describe a consistent type of rating dependence as a function of the base class are used for merging preference models across users. The merger operation is straightforward in this case because the base classes are non-composite. Therefore, the merger process will yield a non-empty intersection only for those preference models whose item description is the same base class. In this scenario, preference model merging is carried out by sequentially examining all of the base classes and noting which users in the group have a preference model containing that base class. Where one or more users are found to have such a preference model then the degree of appeal is noted for that base class, and the base class is taken as the merged item description.

After creating a merged item description, the system may calculate a merged degree of appeal for the item 1319. A consideration may be how to handle cases in which, for a given merged item description, there are users in the group who do not have preference models with item descriptions that match it. For example, the merged item description "Class: Juicy-Jammy" being formed on the basis of two users whose preference models contained item descriptions: "Class: Juicy-Jammy" and "Class: Red Wine," there may be one or more other users who don't have preference models that fall within the scope of the descriptions with the range of "Class: Juicy-Jammy" to "Class: Red Wine." Two possible ways to handle such situations are to: (1) calculate the merged degree of appeal from only those values present; or (2) assign a default degree of appeal to the users who do not contribute such values.

In the present example the second approach may be used wherein the left out users are assigned a neutral degree of appeal. Other methods for assigning a default degree of appeal are possible. One is to take the average of the user's ratings or take the average rating of some related group of users or, possibly, the average rating of all users.

There are a number of different ways of calculating a merged degree of appeal. One way is to take the arithmetic average of the numerically represented degrees of appeal. Other schemes are possible wherein the degree of appeal can receive more or less weight in the calculation depending on the user. For example, a user's spouse or work supervisor could be assigned a higher weight than that assigned to the user himself or herself. Another weighting scheme may use the confidence measure associated with the preference models contributing the appeal measures. Other measures, such as the mode of the ratings, may be used. If the degree of appeal is not represented numerically then other schemes would have to be devised to represent the merged degree of appeal.

Another step is calculating a confidence measure for the merged model 1321. This step may be omitted if it is not required for ordering the preference models or is not being reported to the users. This confidence measure is a calculation based on the confidences assigned to the preference models that form the basis of the merged model. A straightforward method is to take their arithmetic average. In the present embodiment, because the default neutral ratings are not backed by a preference model, they contribute a 0 confidence level. Thus the confidence level of the merged models that contain users that have no preference model associated with the merged model will be lower than those in which such users were not included in the merged model. Other methods for calculating a merged confidence level on the basis of the confidences of the contributing preference models are possible.

Prior to creating a merged preference model for a group, it may be desirable to impose one or more criteria to select which of the merged preference models should be used as a basis from which to make recommendations. For example, in one embodiment, only those merged preference models whose comprising preference models attain a minimum degree of appeal (such as a rating of "Like") may be accepted. Other criteria are possible such as a minimum degree of appeal for the merged preference model. The system also may require a minimum degree of confidence for the merged preference models. Also, the system may require that a minimum number of users contribute preference models to the merged model, e.g. greater than one.

There are multiple methods for ordering of the merged preference models, two of which may be: (1) ordering on the basis of a "social welfare function" and (2) ordering such that the satisfaction of one or more users is accommodated in given a precedence ordering. Two social welfare functions usable by the first method are described here. With respect to the second method, the following describes a method for computing a preference ordering based on user precedence. The system also may be able to determine a precedence order for users that have not been assigned one, or even for all users if desired.

One example of a social welfare function is one that orders the merged preference models in the direction of decreasing merged appeal. If the confidence level of the merged models are available then they can be used as a secondary sorting criterion for preference models that are tied on the basis of appeal. Thus the most appealing preference models which have the highest confidence may appear earlier in the ordering. When using numeric values for appeal and/or confidence, it may be useful to limit the precision of these representations, or to bin the representations, such that imperceptible differences in appeal or confidences are represented by the same value. Otherwise, tie-breaking mechanisms may be inoperative.

One drawback of using a "pure" merged model appeal and confidence as a social welfare function for ordering is that it is possible by chance that a model that has a preponderance of low appeals among its users may appear before a model that has good levels of appeal across its members if given that both models have the same merged appeal level. To remedy this, in one embodiment, the group ordering may use a weighted, bipolar average of the appeal of the preference models comprising the merged model. The bipolar appeal values may be created by subtracting the value representing neutral appeal. The weights may be derived from the confidence levels of the contributing preference models. Additional ordering may be performed to break ties by using tallies of the degree of confidence of the contributing models. These tallies may be obtained by first partitioning the degree of confidence into discrete ranges (bins). Then the number of contributing preference models falling into each of the bins may be counted. The tally of the highest, next highest and successively lower confidence bins, may be used as the second, third and successively later ordering variables. The resultant ordering may be one in which the number of preference models, with more than neutral appeal, contributing to a merged model is maximized in a way that also considers the model confidence.

In some embodiments, various members of a group may be assigned a precedence order. In the example of FIG. 5, if the system receives a command to prioritize the users 505 it may assign a precedence order—i.e., rank—the group members such as in the order in which they are organized on the user interface 503. The degree of appeal and the confidence level of the preference models comprising the merged models may be partitioned into discrete bins. For example, the appeals and confidences for various users may each be partitioned into four bins. The ordering may be based first on the binned appeal and then the binned confidence of the contributing preference models for the highest precedence user across all merged models. The ordering may be continued by considering the binned appeal and binned confidence of the contributing preference models from the user next highest in precedence. The sequence of ordering variables may likewise by extended by concatenating the binned appeals and confidences obtained from the preference models of users that were successively lower in precedence.

If some or all of the users were not assigned a precedence order then they can be obtained as described by the following prior to ordering the merged preference models. The ordering may be derived on the basis of only the users that were assigned precedence. The binned appeal and confidence levels of the preference models from the unassigned users may be examined in the established ordering to determine which of these users "dominates" the other. Dominance is based on the combination of a higher binned appeal and, if tied, on a higher binned confidence. A level of dominance may be determined for each user starting from the first spot in the ordering and proceeding through it. At various steps in the process, dominance may be determined, and users which fail to meet the maximum dominance may be dropped from further consideration. When one user remains it is given the next highest available precedence value. If there is a tie then any suitable method can be used for ordering the tied users. In the present embodiment they may be assigned the next precedence spots in the order in which they happen to appear in the data representing their identities. A new ordering of the merged preference models may be determined using the newly augmented user precedence order. The above process may again be repeated to obtain the next highest precedence users. This may continue until one or no users need to have a precedence order assigned to them. The final ordering of merged preference models found in the above process may be kept and passed on to the next phase of the process.

Returning to FIG. 13, the identification of recommendable items 1325 may proceed directly from the ordered list of merged preference models generated. Each merged preference model contains a merged description of the items to which it pertains. Suitably conditioned, that description can be presented to a database and a list of items matching the description can be retrieved, i.e. the items are identified. For example, a merged preference model might have the merged item descriptor "Class: Juicy-Jammy". This can be translated into a relational database inquiry of the form: SELECT Wine-ID from Wines WHERE Class='Juicy-Jammy'. This retrieval can also be conditioned on contingent factors not related to the merged preference model such as price, availability and other such constraints that the group of users might impose, e.g. SELECT Wine-ID from Wines WHERE Class='Juicy-Jammy' AND Price<20.

When there is more than one merged preference model in the list then one may consider several strategies for determining which of them are to be used for identifying items. A set of recommendable items can be obtained from each merged preference model, and the whole ensemble of sets may be concatenated together, after eliminating duplicated items, and presented to the group in the order in which the item sets were obtained. It is also possible however to develop a shorter list of identified items by first consulting with the group and asking them to select from and possibly reorder the merged item descriptions from which recommendable items will be identified. Other schemes for shortening and reordering the list of merged preference models are possible. One embodiment presents an ordered list of merged item identifications in the form of user-friendly renditions of the wine base classes and gives the group the opportunity to select from the list or to reorder it. The system also may present a list of identified items obtained from the highest priority merged preference model from which such items could be found in the database. Thus the group has the option to use the initially identified items or to call for a set of identifications based on their own priorities.

The methods of generating the group preference models described here can be applied to preference models constructed from preference descriptions generated by methods other than those described above. In such cases, the output from the recommendation system may be used to construct preference models of the consistent appeal type. This requires having a description of the recommended items and their degree of appeal in those cases where recommendations are for items having a given degree of appeal.

By their nature, recommendation systems find items that are thought to be most appealing to the user and because the prospective ratings of such items necessarily fall within a restricted range, i.e. appealing, they match the rating dependence pattern for consistent appeal. Further, there are also recommendation systems that generate explicit descriptions of items that are appealing, or for which such descriptions can be extracted from the workings of the system. Such recommendation systems can therefore be used to construct preference models of the consistent appeal type. Recommendation systems typically do not provide descriptions of unappealing items, but such descriptions may be extracted from the data within them. Such data may be used to identify items that are consistently unappealing to members of the group.

If the recommendation system provides only appealing and/or unappealing item classifications, then the group profile may be mapped to the most appealing and the most unappealing degrees of appeal. If various levels or gradations of appeal can be obtained from a recommendation system, then the levels may be mapped to span the appropriate range of the most appealing to the most unappealing. To the extent that item descriptions are given in terms of the item traits and item attributes, then those values may be used to create the preference model.

It was mentioned above that preference models may be obtained from a recommender system. The following example explains how this may work by considering a recommendation system based on a tree algorithm. When dealing with a user who exhibits a preference for fruitful wines, the prediction algorithm of such a system may generate the internal formula:

$$\left\{ \begin{array}{l} \text{Fruit intensity} \geq \text{Medium} = \text{Like} \\ \text{Fruit intensity} < \text{Medium} = \text{Dislike} \end{array} \right\}$$

Acting on those predictions, the recommendation system may proffer wines having greater than medium fruit intensity but would do so without reporting a preference profile. This profile could be externalized by transliterating this formula to generate an explicit preference profile: Item Description is "Fruit Intensity: 3 to 5" and Appeal is "Like". Thus, recommendation systems whose inner workings are accessible may be amenable to providing preference profiles of the sort used here to make group recommendations.

Translation of Preference Profiles into Prose Preference Descriptions.

The system may report some or all of a person's or group's preference profile by way of prose. To do this, a series of rules would be used to generate the prose that reflect the patterns of preference and translate those results into consumer-understandable phrase.

Figure 14:
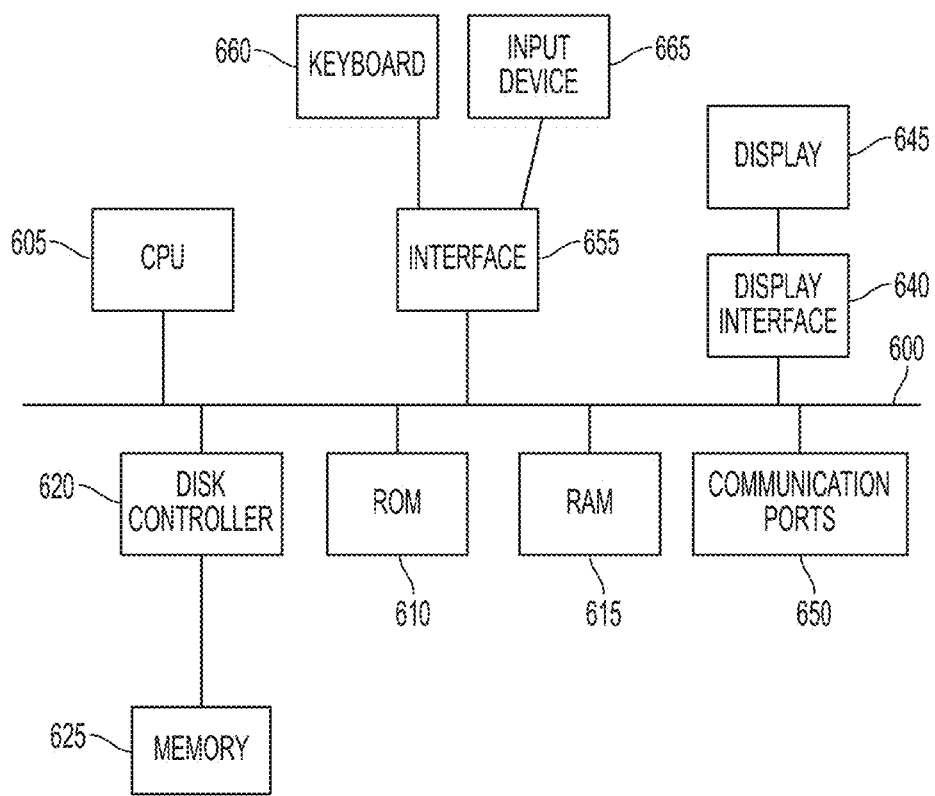
FIG. 14 is a block diagram of internal computer hardware that may be used to contain or implement program instructions according to an embodiment.

FIG. 14 depicts a block diagram of an example of internal hardware that may be used to contain or implement program instructions, such as the process steps discussed above in reference to FIGS. 2 and 13, according to embodiments. A bus 600 serves as an information highway interconnecting the other illustrated components of the hardware. CPU 605 is the central processing unit of the system, performing calculations and logic operations required to execute a program. CPU 605, alone or in conjunction with one or more of the other elements disclosed in FIG. 14, is an example of a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. Communication with external devices, such as a printing device, may occur using various communication ports 640. An exemplary communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The invention claimed is:

1. A group recommendation system, comprising:
    a non-transitory computer-readable medium holding a database comprising characteristics for a plurality of candidate items;
    a processor; and
    a non-transitory computer-readable medium holding programming instructions that, when executed, are configured instruct the processor to:
        identify a preference profile for each user in a group of users, wherein the preference profile for each user comprises data that represents a pattern of dependency between the user's ratings for a plurality of items that the user has rated and characteristics of at least a portion of the rated items to which the user's ratings apply;
        merge a plurality of the users' data that represents the patterns of dependency between ratings and characteristics for the plurality of users into a group preference profile wherein the merging comprises:
            identifying a plurality of consistent preference models for the users,
            merging the identified consistent preference models into a merged preference model, and
            including the merged preference model in the group preference profile;
        receive a request for a group recommendation;
            select, from the database based on the group preference profile, a candidate item having characteristics that at least a plurality of users in group are expected to find appealing; and
        generate a recommendation for the selected candidate item.

2. The system of claim 1, wherein the instructions that are configured instruct the processor to merge a plurality of the users' data into the group preference profile also comprise instructions to:
    identify merged item descriptions for a set of the rated items; and include the merged item descriptions in the group preference profile.

3. The system of claim 2, wherein the instructions that are configured to instruct the processor to identify the merged item descriptions for the set of rated items comprise instructions to:
   identify similar item descriptors in the preference profiles for a plurality of the users; and
   merge the similar item descriptors into the merged item description.

4. The system of claim 3, further comprising instructions that are configured to instruct the processor to require, as a condition of merging the similar item descriptors into the merged item description for an item, that at least a threshold portion of the users have preference profiles that include similar item descriptors for that item.

5. The system of claim 1, wherein the instructions that are configured instruct the processor to merge a plurality of the users' data into the group preference profile also comprise instructions to:
   identify merged degrees of appeal for a plurality of items and classes; and
   include the merged degrees of appeal in the group preference profile.

6. The system of claim 5, wherein the instructions that are configured to instruct the processor to identify the merged degrees of appeal comprise instructions to:
   identify an item or class to which a plurality of the users have assigned similar ratings; and
   merge the similar ratings into the merged degree of appeal.

7. The system of claim 6, further comprising instructions that are configured to instruct the processor to require, as a condition of merging the similar ratings into the merged degree of appeal, that at least a threshold portion of the users have assigned similar ratings to that item or class.

8. The system of claim 1, further comprising instructions that are configured to instruct the processor to determine a confidence level in the group preference profile.

9. The system of claim 1, further comprising instructions that are configured to instruct the processor to:
   determine whether the request for a recommendation comprises a constraint; and
   if the request comprises a constraint, require that the candidate item satisfies the constraint before recommending the candidate item.

10. The system of claim 1, further comprising instructions that are configured to instruct the processor to:
    receive a precedence order for the users in the group; and
    when developing the group preference profile, assign a higher weight to a pattern of dependency associated with a user who is higher in the precedence order than to a pattern of dependency associated with a user who is lower in the precedence order.

11. The system of claim 1, further comprising instructions that are configured to:
    include a plurality of additional merged preference models in the group preference profile; and
    order the merged preference models that are included in the group preference profile on the basis of a social welfare function.

12. A method, comprising:
    receiving, via a user interface, a selection of a group having a plurality of members;
    by a processor, identifying a preference profile for each member, wherein the preference profile for each member comprises:
        data that represents a pattern of dependency between the member's ratings for a plurality of items that the profile's member has rated and characteristics of at least a portion of the rated items to which the member's ratings apply;
    by the processor, developing a group preference profile by merging the data that represents the patterns of dependency between ratings and characteristics for each of the members, wherein the merging comprises:
        identifying a plurality of consistent preference models for the members, wherein each of the consistent preference models is associated with a positive degree of appeal,
        merging the identified consistent preference models into a merged preference model, and
        including the merged preference model in the group preference profile;
    receiving, via the user interface, a request for a recommendation for an item;
    by the processor, accessing a database of candidate items, wherein each candidate item is associated with at least one characteristic;
    by the processor, using the group preference profile to select, from the database, a candidate item having characteristics which are likely to appeal to at least a plurality of members of the group; and
    by the processor, generating a recommendation for the selected candidate item.

13. The method of claim 12, further comprising:
    determining that the request for a recommendation comprises a constraint; and
    when selecting the identified candidate item, confirming that the identified candidate item satisfies the constraint.

14. The method of claim 12, wherein merging the data that represents a pattern of dependency to develop the group preference profile also comprises:
    identifying merged item descriptions for a set of items that have been rated by the members; and
    including the merged item descriptions in the group preference profile.

15. The method of claim 14, wherein identifying the merged item descriptions for the set of rated items comprises:
    identifying similar item descriptors in the preference profiles for a plurality of the users; and
    merging the similar item descriptors into the merged item description.

16. The method of claim 15, further comprising, as a condition of merging the similar item descriptors into the merged item description for an item, requiring that at least a threshold portion of the members have preference profiles that include similar item descriptors for that item.

17. The method of claim 12, wherein merging the data that represents a pattern of dependency to develop the group preference profile also comprises:
    identifying merged degrees of appeal for a plurality of items and classes; and
    including the merged degrees of appeal in the group preference profile.

18. The method of claim 17, wherein identifying the merged degrees of appeal comprises:
    identifying an item or class to which a plurality of the members have assigned similar ratings; and
    merging the similar ratings into the merged degree of appeal.

19. The method of claim 18, further comprising, as a condition of merging the similar ratings into the merged degree of appeal, requiring that at least a threshold portion of the identified users have assigned similar ratings to that item or class.

20. The method of claim 12, further comprising determining a confidence level in the group preference profile.

21. The method of claim 12, further comprising:
receiving a precedence order for the members; and
when developing the group preference profile, assigning a higher weight to a pattern of dependency associated with a member who is higher in the precedence order than to a pattern of dependency associated with a member who is lower in the precedence order.

22. The method of claim 12, further comprising:
including a plurality of additional merged preference models in the group preference profile; and
ordering the merged preference models that are included in the group preference profile on the basis of a social welfare function.

23. A group recommendation system, comprising:
a non-transitory computer-readable medium holding a database comprising characteristics for a plurality of candidate items;
a processor; and
a non-transitory computer-readable medium holding programming instructions that, when executed, are configured instruct the processor to:
identify a preference profile for each user in a group of users, wherein the preference profile for each user comprises data that represents a pattern of dependency between the user's ratings for a plurality of items that the user has rated and characteristics of at least a portion of the rated items to which the user's ratings apply;
merge a plurality of the users' data that represents the patterns of dependency between ratings and characteristics for the plurality of users into a group preference profile wherein the merging comprises:
identifying merged item descriptions for a set of the rated items by:
identifying similar item descriptors in the preference profiles for a plurality of the users; and
merging the similar item descriptors into the merged item descriptions while requiring, as a condition of merging the similar item descriptors into the merged item description for an item, that at least a threshold portion of the users have preference profiles that include similar item descriptors for that item, and
including the merged item descriptions in the group preference profile;
receive a request for a group recommendation;
select, from the database based on the group preference profile, a candidate item having characteristics that at least a plurality of users in group are expected to find appealing; and
generate a recommendation for the selected candidate item.

24. The system of claim 23, wherein the instructions that are configured to instruct the processor to merge a plurality of the users' data into the group preference profile also comprise instructions to:
identify merged degrees of appeal for a plurality of items and classes; and
include the merged degrees of appeal in the group preference profile.

25. The system of claim 24, wherein the instructions that are configured to instruct the processor to identify the merged degrees of appeal comprise instructions to:
identify an item or class to which a plurality of the users have assigned similar ratings; and
merge the similar ratings into the merged degree of appeal.

26. The system of claim 25, further comprising instructions that are configured to instruct the processor to require, as a condition of merging the similar ratings into the merged degree of appeal, that at least a threshold portion of the users have assigned similar ratings to that item or class.

27. The system of claim 23, further comprising instructions that are configured to instruct the processor to determine a confidence level in the group preference profile.

28. The system of claim 23, further comprising instructions that are configured to instruct the processor to:
determine whether the request for a recommendation comprises a constraint; and
if the request comprises a constraint, require that the candidate item satisfies the constraint before recommending the candidate item.

29. The system of claim 23, further comprising instructions that are configured to instruct the processor to:
receive a precedence order for the users in the group; and
when developing the group preference profile, assign a higher weight to a pattern of dependency associated with a user who is higher in the precedence order than to a pattern of dependency associated with a user who is lower in the precedence order.

30. The system of claim 23, wherein:
the instructions that are configured instruct the processor to merge a plurality of the users' data into the group preference profile also comprise instructions to:
identify a plurality of consistent preference models for the users,
merge the identified consistent preference models into a merged preference model, and
include the merged preference model in the group preference profile; and
the non-transitory storage medium further comprises additional instructions that are configured to:
include a plurality of additional merged preference models in the group preference profile, and
order the merged preference models that are included in the group preference profile on the basis of a social welfare function.

31. A group recommendation system, comprising:
a non-transitory computer-readable medium holding a database comprising characteristics for a plurality of candidate items;
a processor; and
a non-transitory computer-readable medium holding programming instructions that, when executed, are configured instruct the processor to:
identify a preference profile for each user in a group of users, wherein the preference profile for each user comprises data that represents a pattern of dependency between the user's ratings for a plurality of items that the user has rated and characteristics of at least a portion of the rated items to which the user's ratings apply;
merge a plurality of the users' data that represents the patterns of dependency between ratings and characteristics for the plurality of users into a group preference profile wherein the merging comprises:

identifying merged degrees of appeal for a plurality of items and classes by:
    identifying an item or class to which a plurality of the users have assigned similar ratings; and
    merging the similar ratings into the merged degree of appeal while requiring, as a condition of merging the similar ratings into the merged degree of appeal, that at least a threshold portion of the users have assigned similar ratings to that item or class, and
    including the merged degrees of appeal in the group preference profile;
receive a request for a group recommendation;
    select, from the database based on the group preference profile, a candidate item having characteristics that at least a plurality of users in group are expected to find appealing; and
    generate a recommendation for the selected candidate item.

32. The system of claim 31, further comprising instructions that are configured to instruct the processor to determine a confidence level in the group preference profile.

33. The system of claim 31, further comprising instructions that are configured to instruct the processor to:
    determine whether the request for a recommendation comprises a constraint; and
    if the request comprises a constraint, require that the candidate item satisfies the constraint before recommending the candidate item.

34. The system of claim 31, further comprising instructions that are configured to instruct the processor to:
    receive a precedence order for the users in the group; and
    when developing the group preference profile, assign a higher weight to a pattern of dependency associated with a user who is higher in the precedence order than to a pattern of dependency associated with a user who is lower in the precedence order.

35. The system of claim 31, wherein:
    the instructions that are configured instruct the processor to merge a plurality of the users' data into the group preference profile also comprise instructions to:
        identify a plurality of consistent preference models for the users,
        merge the identified consistent preference models into a merged preference model, and
        include the merged preference model in the group preference profile; and
    the non-transitory storage medium further comprises additional instructions that are configured to:
        include a plurality of additional merged preference models in the group preference profile, and
        order the merged preference models that are included in the group preference profile on the basis of a social welfare function.

36. A method, comprising:
    receiving, via a user interface, a selection of a group having a plurality of members;
    by a processor, identifying a preference profile for each member, wherein the preference profile for each member comprises data that represents a pattern of dependency between the member's ratings for a plurality of items that the profile's member has rated and characteristics of at least a portion of the rated items to which the member's ratings apply;
    by the processor, developing a group preference profile by merging the data that represents the patterns of dependency between ratings and characteristics for each of the members, wherein the merging comprises:
        identifying merged item descriptions for a set of items that have been rated by the members by:
            identifying similar item descriptors in the preference profiles for a plurality of the members; and
            merging the similar item descriptors into the merged item description while requiring, as a condition of merging the similar item descriptors into the merged item description for an item, that at least a threshold portion of the members have preference profiles that include similar item descriptors for that item, and
        including the merged item descriptions in the group preference profile;
    receiving, via the user interface, a request for a recommendation for an item;
    by the processor, accessing a database of candidate items, wherein each candidate item is associated with at least one characteristic;
    by the processor, using the group preference profile to select, from the database, a candidate item having characteristics which are likely to appeal to at least a plurality of members of the group; and
    by the processor, generating a recommendation for the selected candidate item.

37. The method of claim 36, further comprising:
    determining that the request for a recommendation comprises a constraint; and
    when selecting the identified candidate item, confirming that the identified candidate item satisfies the constraint.

38. The method of claim 36, wherein merging the data that represents a pattern of dependency to develop the group preference profile comprises:
    identifying merged degrees of appeal for a plurality of items and classes; and
    including the merged degrees of appeal in the group preference profile.

39. The method of claim 38, wherein identifying each of the merged degrees of appeal comprises:
    identifying an item or class to which a plurality of the members have assigned similar ratings; and
    merging the similar ratings into the merged degree of appeal.

40. The method of claim 39, further comprising, as a condition of merging the similar ratings into the merged degree of appeal, requiring that at least a threshold portion of the identified members have assigned similar ratings to that item or class.

41. The method of claim 36, further comprising determining a confidence level in the group preference profile.

42. The method of claim 36, further comprising:
    receiving a precedence order for the members; and
    when developing the group preference profile, assigning a higher weight to a pattern of dependency associated with a member who is higher in the precedence order than to a pattern of dependency associated with a member who is lower in the precedence order.

43. The method of claim 36, wherein:
    merging the data that represents a pattern of dependency to develop the group preference profile also comprises:
        identifying a plurality of consistent preference models for the members, wherein each of the consistent preference models is associated with a positive degree of appeal, merging the identified consistent preference models into a merged preference model, and including the merged preference model in the group preference profile; and the method further comprises:

including a plurality of additional merged preference models in the group preference profile, and ordering the merged preference models that are included in the group preference profile on the basis of a social welfare function.

44. A method, comprising:

receiving, via a user interface, a selection of a group having a plurality of members;

by a processor, identifying a preference profile for each member, wherein the preference profile for each member comprises data that represents a pattern of dependency between the member's ratings for a plurality of items that the profile's member has rated and characteristics of at least a portion of the rated items to which the member's ratings apply;

by the processor, developing a group preference profile by merging the data that represents the patterns of dependency between ratings and characteristics for each of the members, wherein the merging comprises:

identifying merged degrees of appeal for a plurality of items and classes by:

identifying an item or class to which a plurality of the members have assigned similar ratings, and merging the similar ratings into the merged degree of appeal, while requiring, as a condition of merging the similar ratings into the merged degree of appeal, requiring that at least a threshold portion of the identified members have assigned similar ratings to that item or class, and including the merged degrees of appeal in the group preference profile;

receiving, via the user interface, a request for a recommendation for an item;

by the processor, accessing a database of candidate items, wherein each candidate item is associated with at least one characteristic;

by the processor, using the group preference profile to select, from a database, a candidate item having characteristics which are likely to appeal to at least a plurality of members of the group; and by the processor, generating a recommendation for the selected candidate item.

45. The method of claim 44, further comprising determining a confidence level in the group preference profile.

46. The method of claim 44, further comprising:

receiving a precedence order for the members; and when developing the group preference profile, assigning a higher weight to a pattern of dependency associated with a member who is higher in the precedence order than to a pattern of dependency associated with a member who is lower in the precedence order.

47. The method of claim 44, wherein:

merging the data that represents a pattern of dependency to develop the group preference profile also comprises:

identifying a plurality of consistent preference models for the members, wherein each of the consistent preference models is associated with a positive degree of appeal, merging the identified consistent preference models into a merged preference model, and including the merged preference model in the group preference profile; and the method further comprises:

including a plurality of additional merged preference models in the group preference profile, and ordering the merged preference models that are included in the group preference profile on the basis of a social welfare function.

* * * * *